US012688030B2

(12) United States Patent
Francis

(10) Patent No.: US 12,688,030 B2
(45) Date of Patent: Jul. 21, 2026

(54) SOFTWARE UPDATE MANAGEMENT FOR VEHICLES

(71) Applicant: Volkswagen Aktiengesellschaft, Wolfsburg (DE)

(72) Inventor: Jörg Francis, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 321 days.

(21) Appl. No.: 18/571,111

(22) PCT Filed: Jun. 14, 2022

(86) PCT No.: PCT/EP2022/066174
§ 371 (c)(1),
(2) Date: Dec. 15, 2023

(87) PCT Pub. No.: WO2022/268572
PCT Pub. Date: Dec. 29, 2022

(65) Prior Publication Data
US 2024/0281243 A1 Aug. 22, 2024

(30) Foreign Application Priority Data

Jun. 23, 2021 (DE) ..................... 10 2021 206 444.2

(51) Int. Cl.
*G06F 8/65* (2018.01)
(52) U.S. Cl.
CPC ...................................... *G06F 8/65* (2013.01)
(58) Field of Classification Search
CPC ....................................................... G06F 8/65
See application file for complete search history.

(56) References Cited

U.S. PATENT DOCUMENTS

| | | | |
|---|---|---|---|
| 11,861,221 B1 * | 1/2024 | Richardson | G06F 3/0647 |
| 2005/0256614 A1 | 11/2005 | Habermas | 701/1 |
| 2018/0048473 A1 * | 2/2018 | Miller | G06F 21/57 |
| 2018/0081670 A1 * | 3/2018 | Caushi | G07C 5/00 |
| 2019/0265965 A1 * | 8/2019 | Acharya | H04L 12/40 |
| 2020/0057630 A1 * | 2/2020 | Cho | G06F 8/65 |
| 2021/0026617 A1 * | 1/2021 | Maru | G06F 8/65 |

(Continued)

FOREIGN PATENT DOCUMENTS

| | | | | |
|---|---|---|---|---|
| CN | 112104736 A | * | 12/2020 | G06F 8/71 |
| WO | 2022/268572 A1 | | 12/2022 | G06F 8/65 |

OTHER PUBLICATIONS

"Draft Recommendation on Software Updates of the Task Force on Cyber Security and Over-the-Air Issues of UNECE WP.29 IWG ITS/AD," ITU-T Draft, Study Period 2017-2020, Study Group 15, International Telecommunication Union, Geneva, CH, vol. ties/17, 31 pages, Aug. 31, 2018.

(Continued)

*Primary Examiner* — Daxin Wu
(74) *Attorney, Agent, or Firm* — Slayden Grubert Beard PLLC

(57) ABSTRACT

The disclosure refers to a system for managing software updates for vehicles, comprising a server computing device configured to provide at least one software update from a software repository, and a plurality of vehicles, each of the vehicles having a vehicle computing device configured to receive and execute the at least one software update.

8 Claims, 27 Drawing Sheets

(56) References Cited

U.S. PATENT DOCUMENTS

| | | | |
|---|---|---|---|
| 2021/0397431 A1* | 12/2021 | McFarland, Jr. | ..... H04L 9/3239 |
| 2022/0148344 A1* | 5/2022 | Teraoka | ................... G09C 1/00 |
| 2022/0179636 A1* | 6/2022 | Barry | ................... B60R 16/023 |
| 2022/0365771 A1* | 11/2022 | Shelke | ............... G06F 11/0793 |
| 2022/0398083 A1* | 12/2022 | Cosentino | ........... G06F 11/3013 |
| 2023/0138510 A1* | 5/2023 | Shizuka | ............... B60R 16/033 |
| | | | 717/168 |
| 2024/0061671 A1* | 2/2024 | Kikuchi | ................ G07C 5/008 |

OTHER PUBLICATIONS

International Search Report and Written Opinion, Application No. PCT/EP2022/066174, 12 pages, Sep. 26, 2022.

* cited by examiner

Opportunities and requirements by UN ECE SUMS

Establishing and certifying a software management system

Evaluation and certification of vehicles

Establishing a vehicle-specific software identification

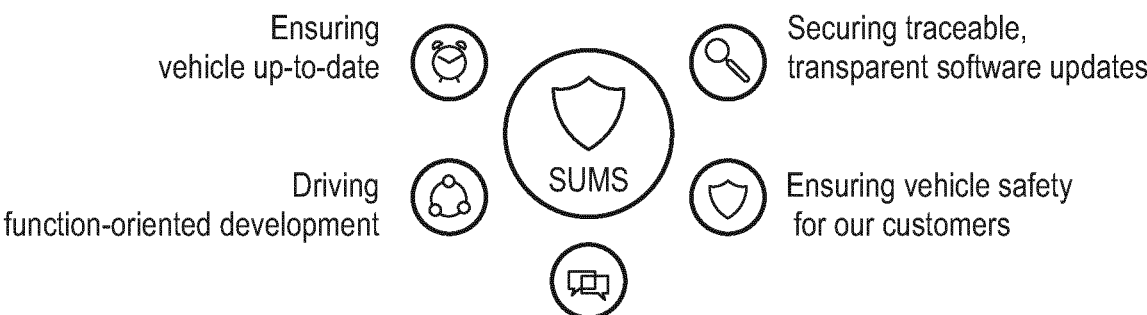

Ensuring
vehicle up-to-date

Securing traceable,
transparent software updates

Driving
function-oriented development

SUMS

Ensuring vehicle safety
for our customers

Simplifying communication with external stakeholders

The SUMS provides a process landscape for assessing the security of software
updates and their impact on vehicle system/parameters, as well as a method for
software indentification of a particular system

| Fig. 2a | Fig. 2b | Fig. 2c | Fig. 2d |
|---------|---------|---------|---------|

Fig. 2a

| | |
|------|------------------------------------|
| R 3 | Reflector |
| R 4 | Rear registration plate illumination |
| R 6 | Direction indicator |
| R 7 | Front and rear position lamps, stop-lamps |
| R 10 | Electromagnetic compatibility |
| R 11 | Door latches, door hinges |
| R 12 | Steering mechanism in the event of impact |
| R 13 | Braking |
| R 13H | Braking |
| R 14 | Safety-belt anchorages |
| R 16 | Safety-belts |
| R 17 | Durability of seats/anchorages |
| R 18 | Protection against unauthorized use |
| R 19 | Front fog lamps |
| R 21 | Interior fittings |
| R 23 | Reversing lamps |
| R 24 | Emission from diesel engines |
| R 25 | Head restraints incorporated in vehicle seats |
| R 26 | External projections |
| R 28 | Audible warning devices/signals |
| R 30 | Pneumatic tires |
| R 32 | Behavior in a rear-end collision |
| R 33 | Behavior in a head-on collision |

| | |
|-------|------------------------------------|
| R 140 | Electronic stability control system (ESC) |
| R 141 | Tire pressure monitoring system (TPMS) |
| R 142 | Tire installation |

| | |
|------|------------------------|
| R 34 | Fire safety (fuel tank) |
| R 35 | Arrangement of foot controls |
| R 37 | Filament lamps |
| R 38 | Rear fog lamps |

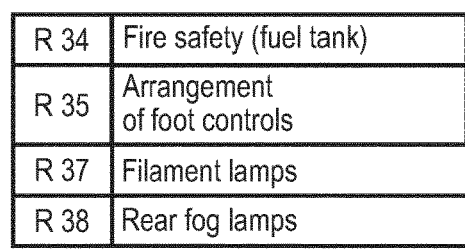

| R 137 | Frontal collision with restraint systems |
|-------|------------------------------------------|
| R 138 | Minimum noise level |
| R 139 | Brake assist systems (BAS) |

| R 133 | Recyclability |
|-------|---------------|
| R 134 | Hydrogen and fuel-cell vehicles |
| R 135 | Pole side impact |

| R 44 | Restraining devices for child occupants |
|------|------------------------------------------|
| R 45 | Headlamp cleaner |
| R 46 | Rear-view mirror |
| R 48 | Lighting/light-signaling devices |

| R 39 | Speedometer |
|------|-------------|
| R 42 | Front and rear protective devices |
| R 43 | Safety glass |

Fig. 2c

| R 129 | Child restraint systems (ECRS) |
|---|---|
| R 130 | Lane departure warning systems (LDWS) |
| R 131 | Advanced emergency braking systems (AEBS) |

| R 126 | Retrofittable luggage partitioning systems |
|---|---|
| R 127 | Pedestrian protection |
| R 128 | LED light source |

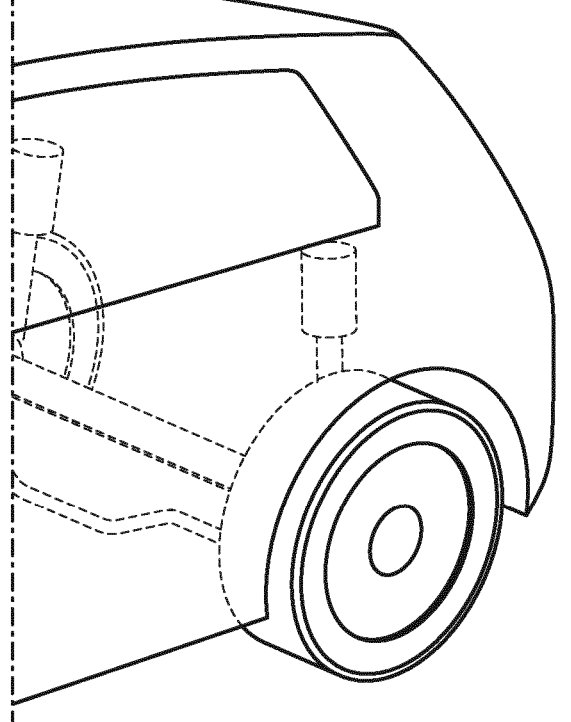

| R 49 | Diesel engine exhaust gases |
|---|---|
| R 51 | Sounds |
| R 55 | Coupling components |

| R 64 | Spare wheels/tires TPMS |
|---|---|
| R 67 | Liquefied petroleum gas drive |
| R 68 | Measurement of the maximum speed |
| R 77 | Parking lamps |

Fig. 2d

| | |
|---|---|
| R 125 | Forward field of vision (direct sight) |
| R 123 | Adaptive front-lighting systems (AFS) |
| R 122 | Heating systems |
| R 121 | Tell-tales and indicators |
| R 119 | Cornering light |
| R 117 | Tire rolling sounds/wet adhesion |
| R 116 | Protection against unauthorized use |
| R 113 | Headlamps emitting a symmetrical beam |
| R 112 | Headlamps emitting an asymmetrical beam |
| R 110 | Drive system with compressed natural gas |
| R 101 | Measurement of CO2 and fuel consumption |
| R 100 | Battery-operated electric vehicles |
| R 99 | Gas-discharge light sources |
| R 98 | Headlamps with gas-discharge light sources |
| R 97 | Alarm systems |
| R 95 | Lateral collision |
| R 94 | Frontal collision |
| R 91 | Side-marker lamps |
| R 89 | Speed limitation device |
| R 87 | Daytime running lamp |
| R 85 | Engine power |
| R 83 | Emission of pollutants |
| R 79 | Steering equipment |

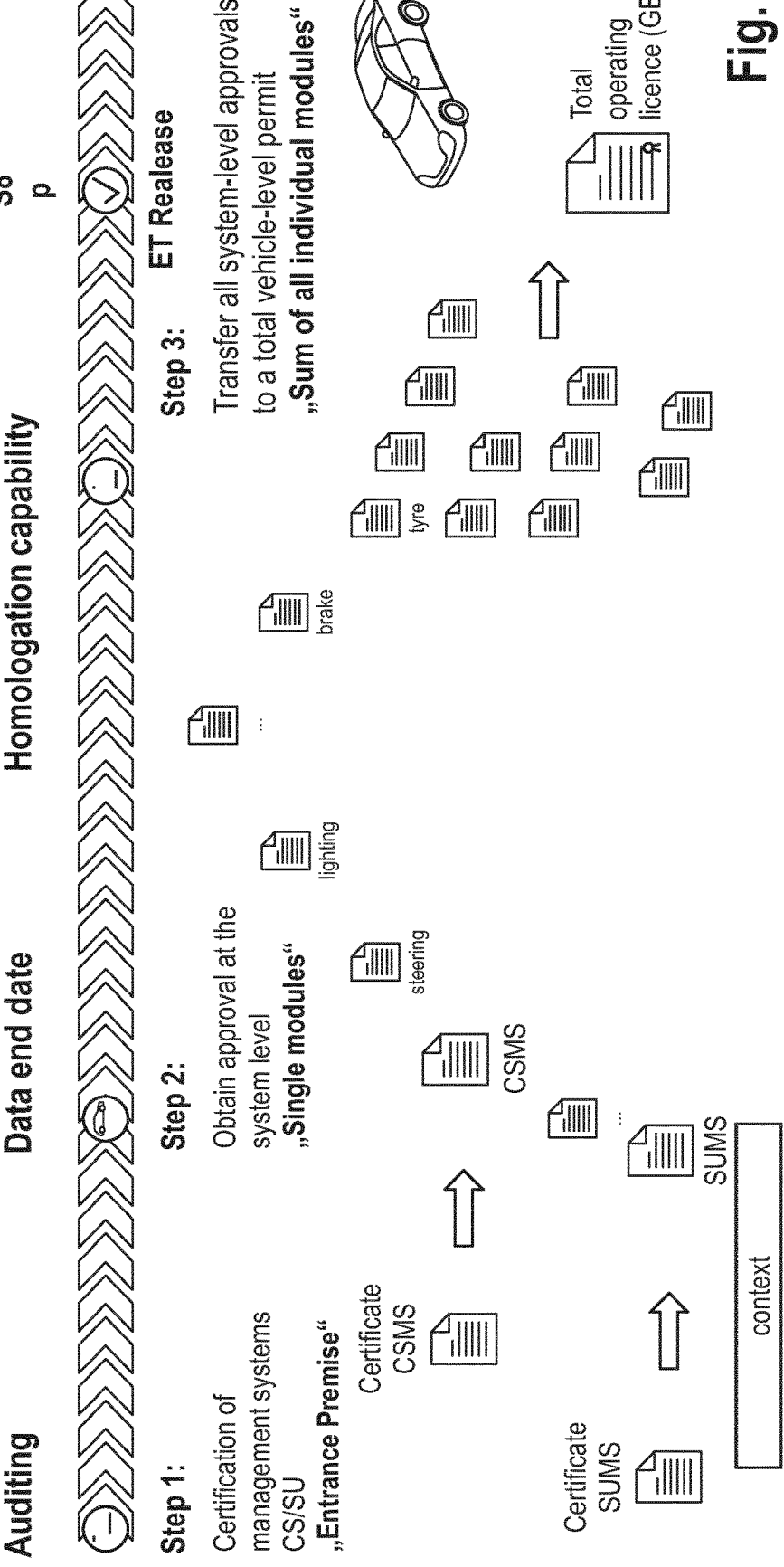

Auditing

Data end date

Homologation capability

S8
p

Step 1:

Certification of
management systems
CS/SU
„Entrance Premise"

Certificate
SUMS

Certificate
CSMS context

SUMS

CSMS

Step 2:

Obtain approval at the
system level
„Single modules"

steering lighting brake

Step 3:

ET Realease

Transfer all system-level approvals
to a total vehicle-level permit
„Sum of all individual modules"

tyre

Total
operating
licence (GBE)

Fig. 3

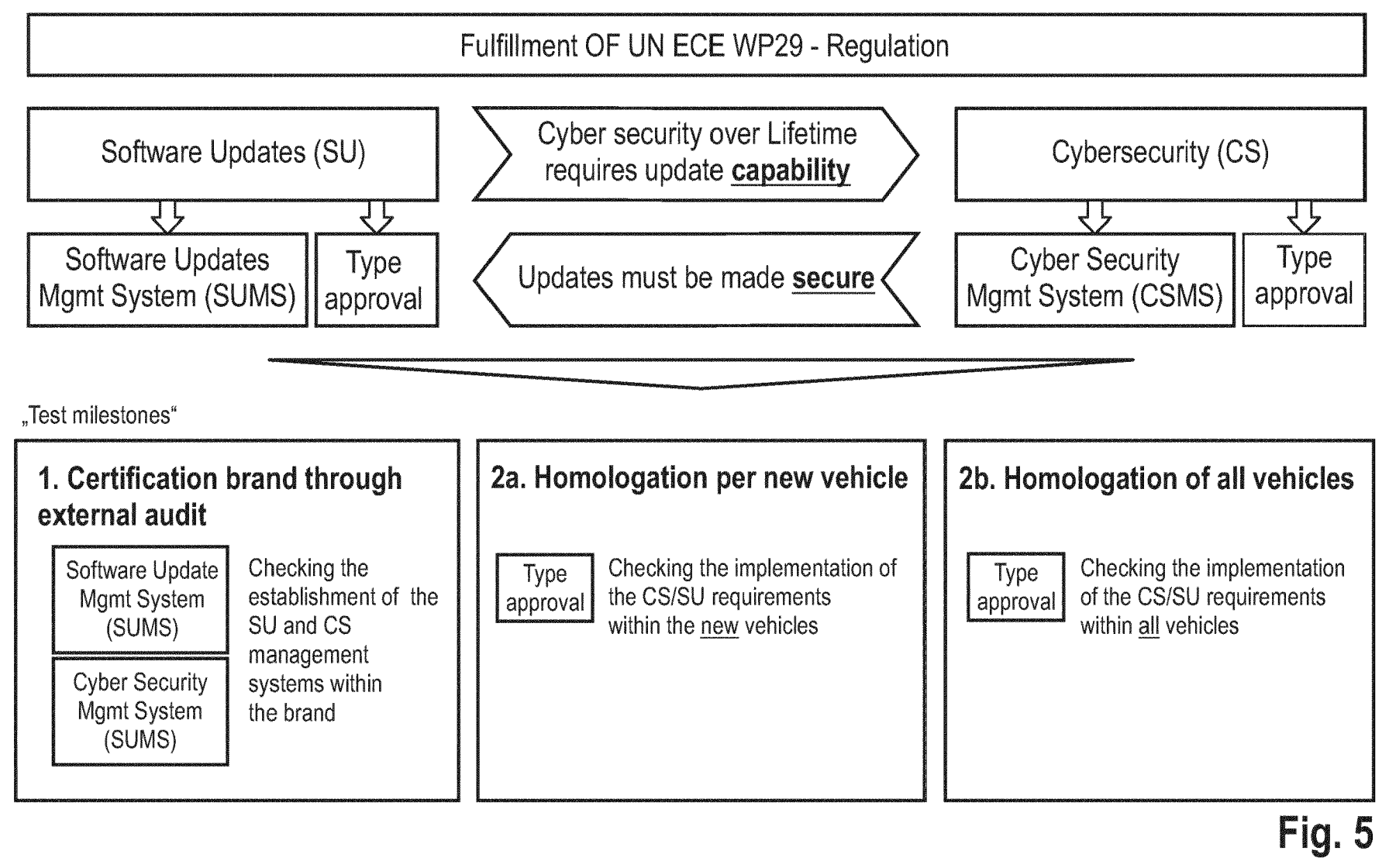

Fulfillment OF UN ECE WP29 - Regulation

Cybersecurity (CS)

Cyber security over Lifetime requires update capability

Updates must be made secure

Cyber Security Mgmt System (CSMS)

Type approval

2b. Homologation of all vehicles

Type approval — Checking the implementation of the CS/SU requirements within _all_ vehicles Software Updates (SU)

Software Updates Mgmt System (SUMS)

Type approval

2a. Homologation per new vehicle

Type approval — Checking the implementation of the CS/SU requirements within the _new_ vehicles „Test milestones"

1. Certification brand through external audit

| Software Update Mgmt System (SUMS) | Checking the establishment of the SU and CS management systems within the brand |
| Cyber Security Mgmt System (SUMS) | |

Fig. 5

Version42

- Kombi-ECU
  (DA: 17)
  → version AB
- ESC_ECU (DA:3)
  → version xy

RxSWIN

Introduction of the software identification number (RxSWIN) for clear designation of the software

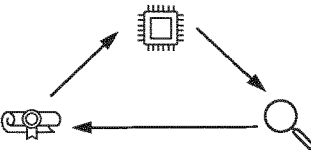

ECU software with influence on regulation

Retyping or extension of the Rx-approval and adaptation of the RxSWIN: update implementation Test whether update has an influence on type test result.

RxSWIN DB

- R1410001
  → Comb-ECU-V AB
  → ESC-ECU-V xy
- R1210001
  → Comb-COMBI-ECU-V AB

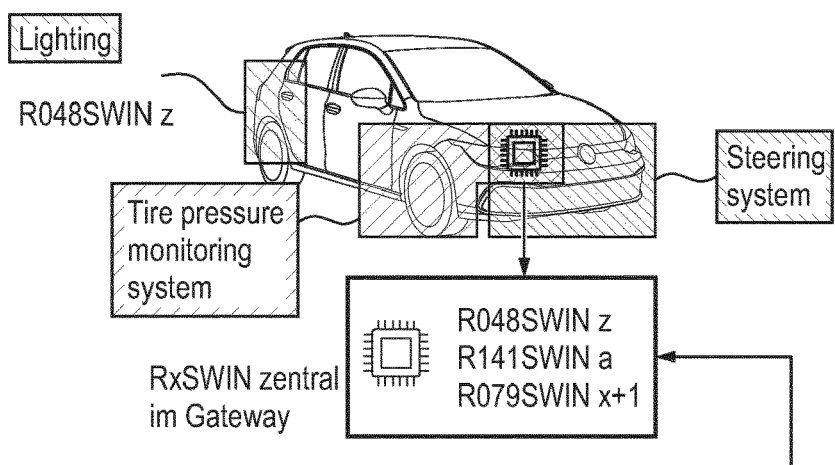

Lighting

R048SWIN z

Tire pressure monitoring system

Steering system

RxSWIN zentral im Gateway

R048SWIN z
R141SWIN a
R079SWIN x+1

Example software updates (focus RxSWIN)

The software of the affected ECU may, for example, has an influence on the regulation
R141: tire pressure monitoring system and/or R79: steering system
Test: Does this update affect the type test result?
R141: Software has no influence on regulatory scopes
R79: software influences regulatory scopes After corresponding retyping or extension of the R79- approval and adjustment of the R79SWIN the update may be carried out

Fig. 8

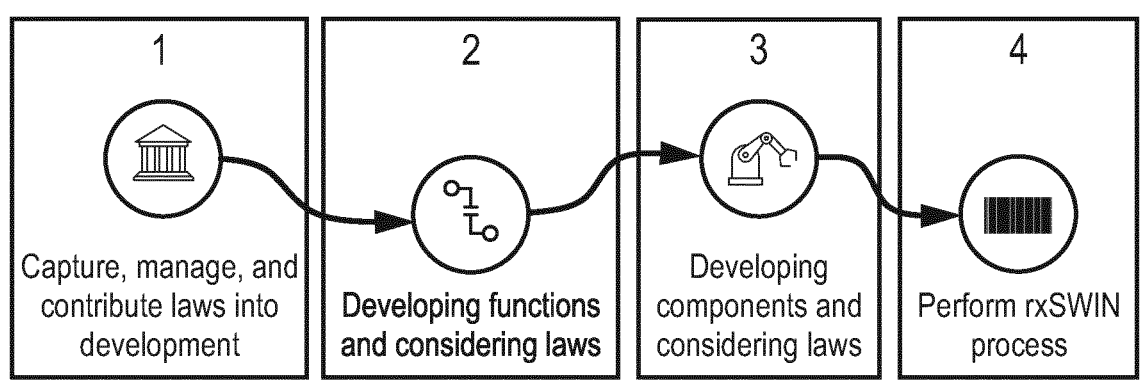

| 1 | 2 | 3 | 4 |
|---|---|---|---|
| Capture, manage, and contribute laws into development | Developing functions and considering laws | Developing components and considering laws | Perform rxSWIN process |

Fig. 12

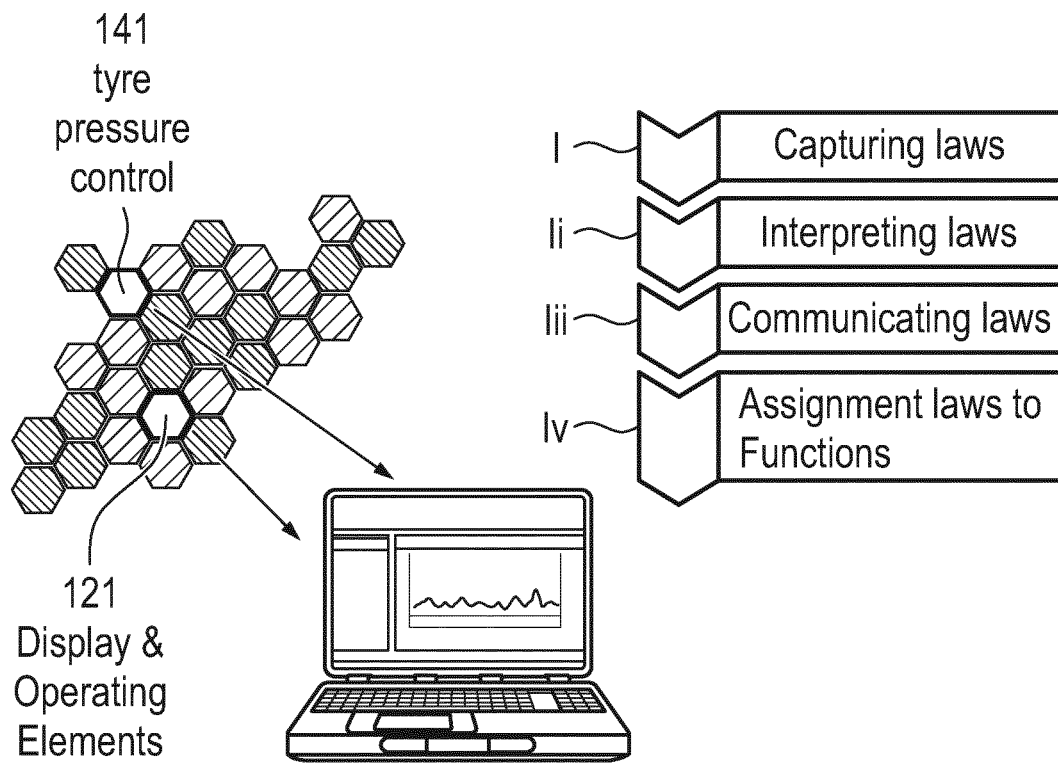

141
tyre
pressure
control

121
Display &
Operating
Elements

I — Capturing laws

Ii — Interpreting laws

Iii — Communicating laws

Iv — Assignment laws to Functions

⬡ UNECE Regulation

⬢ UNECE Regulation with SW Dependencies

Fig. 13

| Fig. 14a | Fig. 14b | Fig. 14c |
|----------|----------|----------|

• Deployment
• Elimination
• Baseline Ver

ECU Ver
ZDC station wagon

ESC

RxSWIN

Software development request

UNECE
• UNECE SW
Update
• IVD
• RxSWIN

Request    Implementation    Integration    Production    CS

SOFTWARE UPDATE MANAGEMENT FOR VEHICLES

CROSS-REFERENCE TO RELATED APPLICATIONS

This application claims priority to German Patent Application No. DE 10 2021 206 444.2, filed on Jun. 23, 2021 with the German Patent and Trademark Office. The contents of the aforesaid Patent Application are incorporated herein for all purposes.

TECHNICAL FIELD

The invention relates to an improved system for managing software updates for vehicles, a vehicle, a database management system, and a method for managing software updates for vehicles.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Vehicles, in particular wheeled vehicles such as, but not limited to, passenger cars, trucks, buses, commercial vehicles, tractors, or the like, have increasingly complex and more software, measured by lines of code of the underlying source code. The term "Software" denotes in particular the part of an electronic control system of a vehicle that consists of digital data and instruction, while an "Electronic Control System" means for example a combination of units, designed to co-operate in the production of the stated vehicle control function by electronic data processing; such an electronic control system comprises discrete functional components such as sensors, electronic control units and actuators, which may be connected by transmission links; they may also include mechanical, electro-pneumatic or electro-hydraulic elements. The dependency of vehicle functionality on software is significantly growing at the present time. Software influences the functionality, safety and performance of a vehicle. In order to ensure the safety and up-to-dateness of vehicles, updates to vehicle software must be applied. Alongside with the increased impact of software on the operation of a vehicle, the importance of the safety and security of software updates itself is growing. While capabilities to update vehicle software have been made possible to a certain extent in the past, such as by personnel, in particular an authorized technician, of vehicle repair shops or other car service stations for instance, those updates are often applied manually, lacking a sophisticated update infrastructure to comply with regulations concerning the updates and the update process itself. Especially when updating the software of a vehicle after certification for adding new functionalities, performing software corrections, or supporting recalls, the update process must meet high standards of integrity, safety and security.

SUMMARY

A need exists to provide a more safe and secure update system and update process and a software update management system, in particular an update system and update process complying with technical prescriptions and regulations concerning the update system and the update process and an software update management system, such as with requirements formulated by UN ECE (the United Nations Economic Commission for Europe).

The UN Regulation R156 covers in particular wheeled vehicles, equipment and parts of the vehicle to this purpose.

The need is addressed by the subject matter of the independent claim(s). Embodiments of the invention are described in the dependent claims, the following description, and the drawings.

BRIEF DESCRIPTION OF THE DRAWINGS

FIG. 1 to FIG. 9 refer to basics and requirements of United Nations Transport/Vehicle Regulations and provide an overview for the implications on the cycle from development via production to customer service and change management;

FIGS. 12 to 20 show a practical example in development for a software update management system as well as steps to implement a software update management system based on the development path.

DESCRIPTION

Figure 2B:
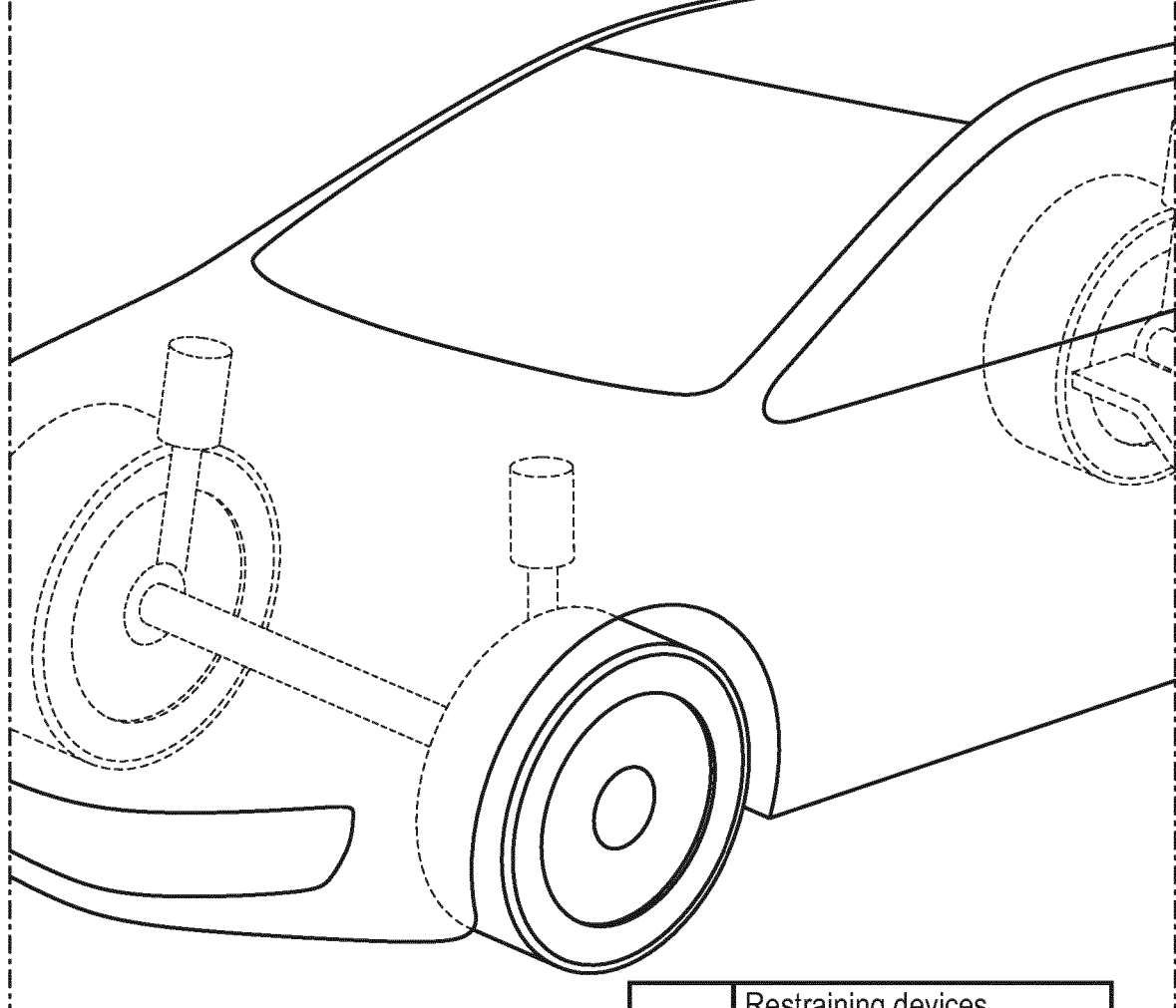

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the above and the following, certain technical terms are used with the following meaning:

"Vehicle type" means vehicles which do not differ in at least the following: (a) the manufacturer's designation of the vehicle type; (b) essential aspects of the design of the vehicle type with respect to software update processes.

"Download" means copying data from one computer system (for example a backend server) to another (for example a vehicle).

"Software update" means a package used to upgrade software to a new version including a change of the configuration parameters. The terms 'update' and 'upgrade' are used synonymously herein to refer to installing new versions of software. The update may contain a fix for a specific problem or change current product functionality or introduce new product functionality.

"Execution of a software update" or "to execute a software update" refers to the process of installing and activating a software update that has been downloaded.

"Software update management system", or abbreviated "SUMS", means a systematic approach defining organizational processes and procedures to comply with the requirements for delivery of software updates according to a regulation.

"Architecture" means a representation of the structure of the item or functions or systems or elements that allows identification of building blocks, their boundaries and interfaces, and includes the allocation of functions to hardware and software elements.

"Certified system" means a system defined by type approval legislation under the 1958 United Nations Agreement or a system as defined by the 1998 United Nations Agreement.

"Vehicle user" means a person operating or driving the vehicle, a vehicle owner, an authorized representative or employee of a fleet manager, an authorized representative or employee of the vehicle manufacturer, or an authorized technician.

"Software" means the part of an electronic control system of a vehicle that consists of digital data and instruction.

"Software bug" means an error, flaw, failure or fault in software that causes it to produce an incorrect or unexpected result, or to behave in unintended ways.

"Software components" means one or more software units.

"Software unit" means an atomic level software component of the software architecture that can be subjected to stand-alone testing.

"Update process" means the steps involved in the downloading and execution of new versions of software.

"Over-the-Air update", or abbreviated "OTA-update", means any method of making data transfers wirelessly instead of using a cable or other local connection.

"System" means a set of components and/or sub-systems that implement a function of functions.

"Integrity validation data" means a representation of digital data, against which comparisons can be made to detect errors or changes in the data.

One aspect refers to a system for managing software updates for vehicles, comprising:

a server computing device configured to provide at least one software update from a software repository, and a plurality of vehicles, each of the vehicles having a vehicle computing device configured to receive and execute the at least one software update.

Software updates may be categorized according to:

Mandatory software updates, in particular corresponding to a bug fix, in particular a kernel fix, a fix corresponding to a security advisory, or functionally safety-critical updates, or the like;

optional software updates, whose download and/or execution is subject to the choice of a vehicle user;

Software updates may include:

Additional functionality of a vehicle electronic control system, or

Changed functionality of a vehicle electronic control system, or

Removed functionality of a vehicle electronic control system.

The system for managing software updates beneficially pays attention to the traceability and security of software updates. Another benefit is provided by ensuring the integrity of the updates to provide additional security, compliance, and clarity. In addition, the use of so-called flash data security meets the UN ECE requirement for secure and tamper-protected programming.

According to an embodiment, the software update comprises a dedicated identifier representing information about a type approval relevant software of an electronic control system contributing to regulation type approval relevant characteristics of a vehicle.

This dedicated identifier is a unique identification number for software updates. It is for example defined by the vehicle manufacturer, representing information about the type approval relevant software of an electronic control system contributing to the Regulation Number 'x' type approval relevant characteristics of the vehicle. Hence, it can be abbreviated as 'RxSWIN', wherein Rx describes the Regulation Number 'x' (e.g. R156 for Regulation Number 156) and 'SWIN' means "Software Identification Number". This dedicated identifier makes it possible to record and track the respective stands of software updates affecting certification criteria.

Another aspect refers to a vehicle, in particular a wheeled vehicle, comprising a vehicle computing device, wherein the vehicle computing device is configured to download and execute at least one software update.

According to an embodiment, the vehicle computing device is configured to run a package manager for determining for each software update at least one of:

package dependencies of the software update, compatibility to an operating system executing the software update, compatibility to an electronic control system of the vehicle affected by the software update, or performing an integrity and/or authenticity check of the software update by comparing computed integrity validation data with integrity validation data provided by a server computing device.

The package manager for example interacts with a software repository containing software updates and thus may be part of the software update management system. The purpose of the package manager is primarily to identify possible software updates, identify deprecated or obsolete software packages, discern optional from mandatory software updates, identify software package dependencies for software updates, and provide rollback functionality in case a software update is broken during the execution. The rollback option is a downgrade of a selected installed software update to a previous version. A software update is considered broken, for instance, if computed integrity validation data of the software update, in particular the computed checksum of a container containing the software update, does not match provided integrity validation data, while integrity validation data for example comprise a checksum or other forms of hash values. For example, the programs 'sha256sum' or 'sha512sum' are used for checking the matching of checksums. Other known in the art verification packages for integrity management to compute and check a message digest—generally speaking—can be used. PGP-keys (PGP means "pretty good privacy"), for example implemented as GPG-keys (GPG means "GNU Privacy Guard") may be imported to the vehicle computing device and its package manager in particular to verify that the integrity validation data such as a specific checksum file is valid. Another cause for a software update to break is a data error during installing or activating the software update. This may be caused by erroneous writing and/or reading of data from and to the storage due to a storage error, a filesystem error, an unexpected power outage, compatibility issues, or the like. The package manager thus provides a utility that allows a user or a vehicle software to manage software packages, in particular software updates. The package manager may be configured to grant the user limited permissions, in particular for the erasing of installed packages or to overwrite missing dependencies, where packages are not explicitly defined to be allowed to be freely overwritten or removed. Specifically, before or during the execution of an update, which may by default skip over software update packages that cannot be installed for dependency reasons, the package manager may be configured to only consider the latest software update packages for execution. For example, when running into packages with broken dependencies, the execution of the package manager is failing while giving a reason why the latest version cannot be executed.

In case the vehicle is outside a vehicle service station or repair shop, the software updates are for example delivered over-the-air. If the download of the software update is failing, the package manager may redirect to a different mirror for downloading the software update.

For example, the vehicle user is able to disable specified software repositories or parts of a software repository to limit the category of updates to be downloaded and executed. For example, the optional limitation does not include security software updates to fix a software bug such as a critical kernel fix, a fix following a security advisory, or is in other terms a mandatory software update. To the contrary, the user may be allowed to enable optional additional repositories with additional functionality, for example dependent on plans and pricing.

For example, the package manger comprises the option to enable verbose operation and to show debug messages in particular for authorized personnel and may be configured to send such debug information to a vehicle manufacturer. The package manager is further for example configured to restart applications and/or to perform a rebooting operation of an operating system of the vehicle computing device after experiencing issues with the execution of a software update or if a restart of an application or an operating system reboot is necessary for a proper execution of the software update.

For example, the package manager is configured to non-interactively check if a software update of at least one specified package or all software packages installed on the vehicle computing device is available on a software repository. If available, the vehicle user is for example notified by a push notification automatically, alternatively by a manual "check for updates" command by the vehicle user.

The package manager stores for example a documented list of RxSWINs as described above in form of a changelog, wherein the changelog can be accessed for example by authorized technicians as well as approval authorities or third parties authorized by such authorities.

According to an embodiment, the vehicle computing device is configured to offer the download and/or execution of the software update to a vehicle user as optional software update. For example, the package manager keeps track of optional software updates that the user selected by marking and executes the selected software updates.

Another aspect refers to a database management system implemented on one or more computing devices and with a first database on a storage for storing a software update repository and for providing at least one software update, and with a second database on a storage for storing at least one dedicated identifier representing information about a type approval relevant software of an electronic control system contributing to regulation type approval relevant characteristics of a vehicle.

The first database and the second database may be implemented as elements of a single superjacent database containing the data of the first database and the second database. The database management system is a technical system implemented on one or more computer devices to perform the technical tasks of storing, retrieving, and providing software update data together with metadata using certain data structures for efficient management of data. Metadata for example include a traceable documentation of all updates regarding changed, added, or removed functionality with regard to vehicle functions such as functions of a driver assistance system of the vehicle affected by the software update. The second database serves in particular for storing metadata such as the plurality of dedicated identifiers, which is a unique identification number for software updates. It is for example defined by the vehicle manufacturer, representing information about the type approval relevant software of an electronic control system contributing to the Regulation Number 'x' type approval relevant characteristics of the vehicle. Hence, it can be abbreviated as 'RxSWIN', wherein Rx describes the Regulation Number 'x' (e.g. R156 for Regulation Number 156) and 'SWIN' means "Software Identification Number". This dedicated identifier makes it possible to record and track the respective stands of software updates affecting certification criteria. It for example furthermore indicates the scope to which functions of physical vehicle components or other functionality of the vehicle is affected.

The system throughput of the database management system is for example improved by using geographically distributed infrastructure elements such as server computing devices with attached storages; query response times are for example reduced by automatically managing data using various data stores with different technical properties such as different levels of consistency or performance. The database management system executes structured queries, which formally and precisely describe the data to be retrieved from the software repository for transmitting it to at least one vehicle. Optimizing the execution of such structured queries with respect to the computer resources needed (such as processor, main memory or hard disk) contribute to performance. This may include the use of an index, hash tables or a query tree, used to facilitate access to data or for the execution of structured queries in particular for the interaction with the above-mentioned package manager of a vehicle computing device. Such an interaction may comprise a query for comparing the current version of a software package in the software repository with the currently installed version on the vehicle computing device, which when a version mismatch is detected, may prompt the database management system to control certain operations to retrieve the software update from the software repository and transmit it to the querying vehicle computing device.

According to an embodiment, the software update repository of the first database comprises a versioned list of software updates, wherein the different versions of software updates with the same functionality are associated with different possible configurations of a vehicle type or with different vehicle types.

According to an embodiment, a database management computing device of the database management system is configured to determine whether an additional or changed functionality of a defined software update affects any certification criteria of the vehicle, and in case the additional or changed functionality affects certification criteria, to do at least one of: await an extension or a new certificate of an approval authority before providing the software update, update the dedicated identifier, perform a functional breakdown of at least the additional or changed functionality of the software update or the whole software update.

The dedicated identifier is a unique identification number for software updates. It is for example defined by the vehicle manufacturer, representing information about the type approval relevant software of an electronic control system contributing to the Regulation Number 'x' type approval relevant characteristics of the vehicle. Hence, it can be abbreviated as 'RxSWIN', wherein Rx describes the Regulation Number 'x' (e.g. R156 for Regulation Number 156) and 'SWIN' means "Software Identification Number".

Once a system is initially certified or type approved (before vehicle registration), any changes to it are assessed regarding whether they may affect its certification or type approval. If it is determined that a software update affects a system's certification or type approval, for example a process is initiated with an approval authority to determine if an extension of an approval or a new approval is needed. The dedicated identifier RxSWIN is updated, for example incremented by one, if this is the case. Otherwise, the dedicated identifier RxSWIN is kept as is. If the software update occurs after a Declaration of Conformance has been produced, the Declaration of Conformance is for example updated reflecting the change of the certification/type approval.

The functional breakdown generates demonstrable dependencies on software, hardware, and target data containers (in case the software update is managed as software container) for UN ECE software update management system compliant software updates. The functional breakdown for example maps the applicable regulations to functions, models functionality of the software update while associating the functions to physical elements of the vehicle being affected by the software update (if applicable), and thus allows for demonstrating compliance of the software update with the applicable regulation. This process may be combined with splitting up software components to their software units for being able to analyze a software update at atomic levels at which the software components can be subjected to stand-alone testing and thus atomic documentation.

Another aspect refers to a method carried out by a system for managing software updates for vehicles, the method comprising:

defining a software update that includes additional or changed functionality compared to a previous software package, providing at least one software update from a software repository.

The system for managing software updates for vehicles may comprise the above-mentioned database management computing system with its database management computing device, such that the method mentioned above and below may be carried out at least partially by the database management computing system.

According to an embodiment, the software update comprises a dedicated identifier representing information about a type approval relevant software of an electronic control system of the vehicle contributing to regulation type approval relevant characteristics of a vehicle, the method further comprising the step of:

determining whether the additional or changed functionality affects any certification criteria of the vehicle, and

8 in case the additional or changed functionality affects certification criteria, doing at least one of: awaiting an extension or a new certificate of an approval authority before providing the at least one software update, updating the dedicated identifier, performing a functional breakdown of at least the additional or changed functionality of the software update or the whole software update.

Once a system is initially certified or type approved (before vehicle registration), any changes to it are assessed regarding whether they may affect its certification or type approval. If it is determined that a software update affects a system's certification or type approval, for example a process is initiated with an approval authority to determine if an extension of an approval or a new approval is needed. The dedicated identifier RxSWIN as explained above is updated, may be incremented by one, if this is the case. Otherwise, the dedicated identifier RxSWIN is kept as is. If the software update occurs after a Declaration of Conformance has been produced, the Declaration of Conformance is for example updated reflecting the change of the certification or type approval.

For example, the determining whether the additional or changed functionality affects any certification criteria of the vehicle is done automatically. This may be done by preprocessing the plain text of a legal text containing certification criteria by searching for keywords, phrases, combination of keywords, by applying a similarity-search method based on predefined keywords. A regular expression-based text analysis for example serves as the basis for preprocessing the legal text. Once preprocessed, the result can be fed as input data into a deterministic-algorithmic or stochastic function, such as a pretrained artificial neural network, an autoregressive language model, Markov chains, or other known methods and models from machine learning to preselect and provide suggestions to whether the additional or changed functionality affects any certification criteria. To this end, the added, removed, or changed functionality introduced with the software update is for example modeled at least partly or for example fully as semantic model comprising terms of a for example discrete set of a functionality database or numerical representation thereof for being connectable to the above mentioned deterministic-algorithmic or stochastic function.

The determining whether the additional or changed functionality affects any certification criteria of the vehicle is for example supported by predefined electronic charts associating language terms of legal texts with certain functions or functionality of software. As described above, extracts of legal texts may be used, which are for example generated by filtering with the help of regular expressions to remove grammatical forms and obtain normalized expressions. The charts may contain stochastic weights to determine a most likely association between sections of a legal text and affected functionality, wherein for example the associations and/or weights can be adjusted over time for example by methods of supervised learning.

The methods of tools and artificial intelligence can be used to perform a functional breakdown of a software update, in particular to produce a semantic model comprising functionality expressions from a for example discrete set of a functionality database or a numerical representation thereof. Automatic tools are for example used, which are implemented on a computer device, that are configured to analyze API calls or data input and/or data output categories, such as the access to camera data of the vehicle and given authority to provide commands for actively influencing steering control of the vehicle, for instance. Such information is suitable to determine the scope of functionality and/or vehicle parts and/or functions that are at least possibly affected by the software update.

According to an embodiment, the method further comprises the step of:

providing integrity validation data associated with the software update.

This beneficially ensures the data integrity of the software and enhances cyber security as manipulation of the software update, such as by a man-in-the-middle attack can be prevented. Furthermore, random data issues or errors caused by network transmission can be identified before the software updated is executed.

The integrity validation data are as explained above for example validated on a vehicle computing device and its package manager in particular.

According to an embodiment, the method further comprises the step of:

transmitting the software update in form of a software container to at least one vehicle.

The software container is generally a file containing at least the package defining the software update and for example also metadata. The software container beneficially allows for compression of the contained data, and for using a well-defined data structure with well-defined content. Furthermore, with the help of the said software container, clear definitions which software package is to be replaced or added to the vehicle software system can be provided.

Another aspect refers to a data processing device comprising a processor and a memory configured to perform at least one of the previous steps.

Another aspect refers to a computer program product comprising instructions which, when the program is executed by a computing device, cause the computing device to carry out at least one of the previous steps.

Another aspect refers to a computer-readable storage medium comprising instructions which, when executed by a computing device, cause the computing device to carry out at least one of the previous steps.

Each computing device mentioned above or below features for example a processor and a memory. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to computing devices either directly or through intervening I/O controllers. Network adapters may also be coupled to the computing devices to enable the data exchange and coupling to other data processing systems or storage devices through intervening private or public networks. Virtual and physical modems, routers, and network adapter cards, are just a few of the currently available types of network equipment available.

The description herein, in particular with regard to the drawings below, is presented for purposes of illustration and understanding, and is not intended to be exhaustive or limited to the invention in the form disclosed. Various modifications and variations will be apparent to those of ordinary skill in the art. The embodiments, in particular with regard to the drawings, are chosen and described in order to best explain the principles of the invention, the practical application, and to enable others of ordinary skill in the art to understand the invention for various embodiments with various modifications as suited to a particular contemplated use.

It should be appreciated that the illustrative embodiments and drawings may take the form of an entirely hardware embodiment, an entirely software embodiment or an embodiment containing both hardware and software elements.

FIG. 1 provides an overview of opportunities and requirements following from the UN ECE (United Nations Economic Commission for Europe) SUMS (software update management systems) requirements. Both, the UN Regulation 155 (regarding cyber security) and the UN Regulation 156 (regarding software updates) are governed by the United Nations and serve as addenda to the 1958 Agreement. Regulation 156 pertains to management systems for the first time in addition to the previous technology-focused regulations concerning vehicle parts.

FIG. 2 shows a list of several vehicle parts and components, such as "R3 rear reflector", "R4 rear number plate lamp", "R6 turning indicator", . . . , "R13 breaks", . . . , "R30 pneumatic tire", . . . , "R37 incandescent lamps", "R38 rear fog-light", and so on—just to name a few. The homologation applicable to the requirements defined in the above-mentioned UN regulations is to be achieved for the shown parts; however, the list is not complete as, for instance, a required first-aid-box is not regulated by vehicle type certification requirements.

FIG. 3 gives an overview of the current draft UN regulation on type-testing of motor vehicles and its implementation. The prerequisite for type approval is the successful certification of the software update management systems as well as the individual system approvals. The fulfillment of requirements regarding cyber security (CS) and software updates (SU) are for example supported or done as a whole by automated method steps.

Figure 4:
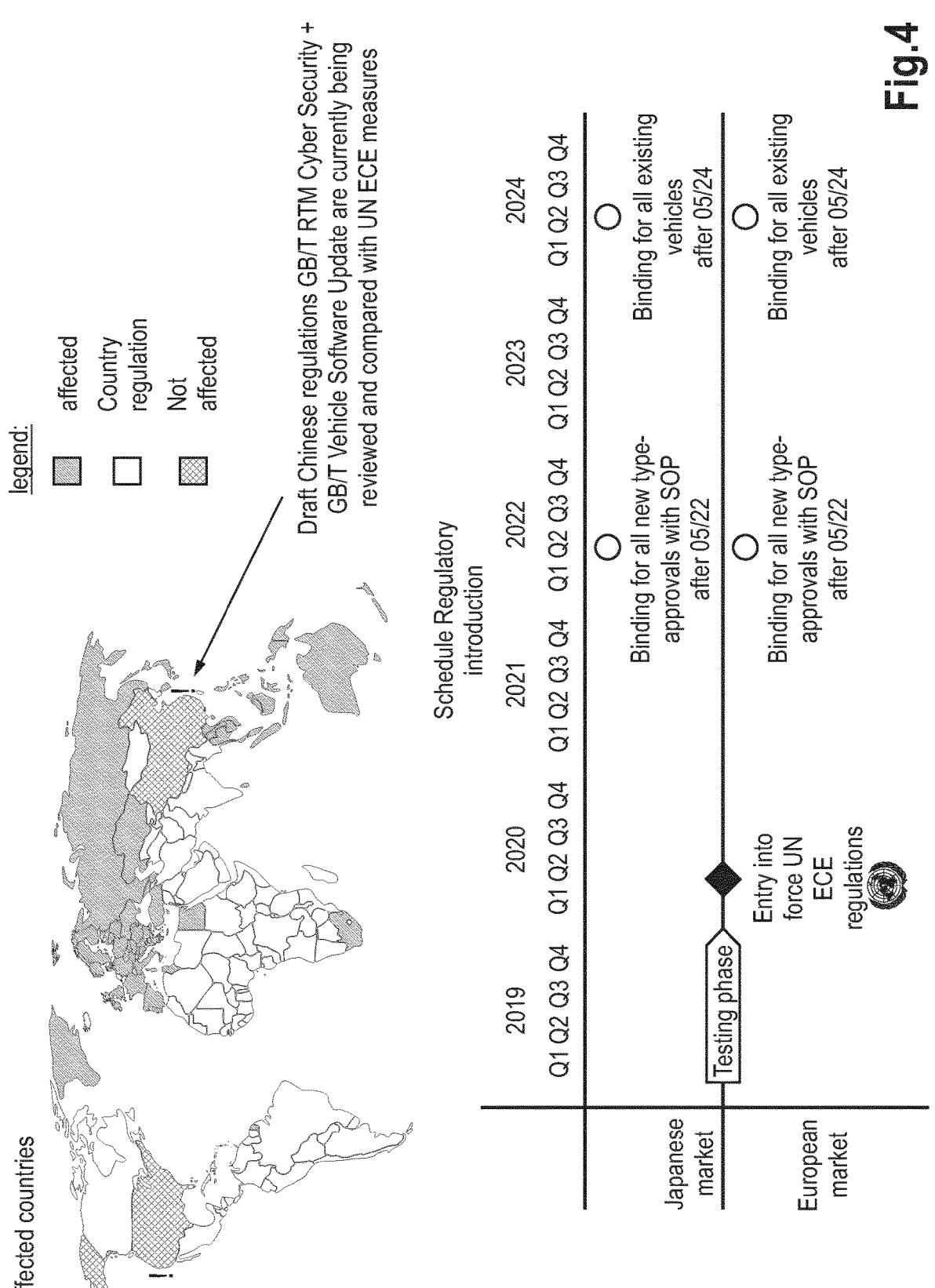

FIG. 4 shows the status of the draft UN regulation on type-testing of motor vehicles. Reference is taken also to draft Chinese regulations GB/T RTM Cyber Security as well as GB/T Vehicle Software Update, which are currently being reviewed and compared with UN ECE measures. This current status is, naturally, subject to change.

FIG. 5 shows the test milestones for certification. While it was sufficient in the past for type certification for a vehicle to obtain approvals for the components and parts as well as functions of a vehicle, for fulfillment of UN ECE WP29 regulation approval of sufficient cyber security and a management ("Mgmt") system needs to be obtained additionally to obtain a holistically certified system. Software updates are hence secured for integrity and authenticity by the adoption of a proper software update management system. One important test milestone is thus the checking of the establishment of systems for software update management and cyber security. The homologation per new vehicle concerns likewise a check of the implementation of the cyber security and software update requirements within the new vehicles. On top of that, homologation of all vehicles needs to be achieved by checking the implementation of the cyber security and of the software update system requirements within all vehicles.

Figure 6:
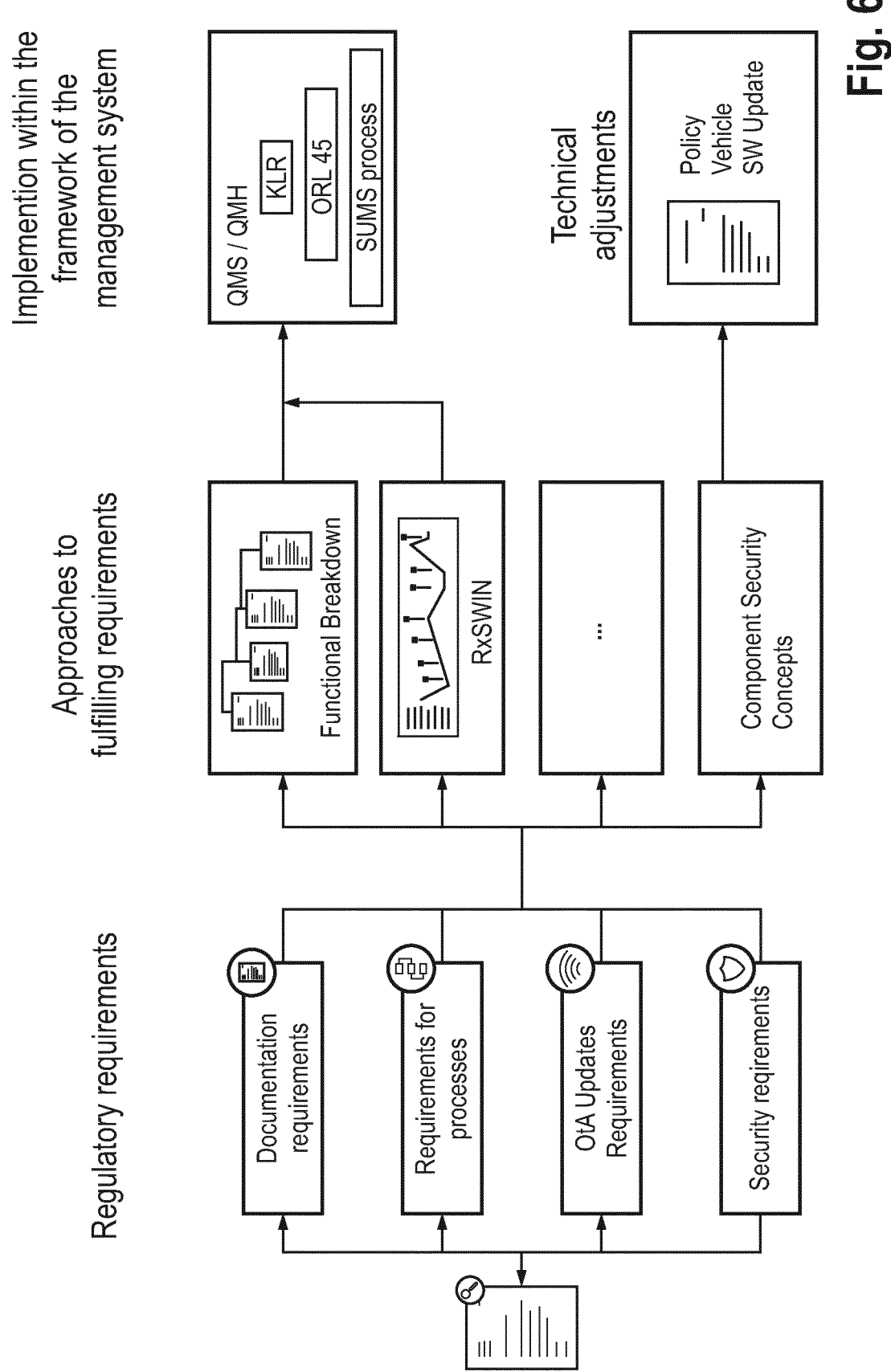

FIG. 6 shows the path from regulatory requirements to a technical management system. A technical software update management system ensures regulatory compliance with software updates at the manufacturer and documents the integrity of the software. Approaches to fulfill the regulatory requirements include a functional breakdown as explained above and the implementation of a dedicated identifier representing information about a type approval relevant software of an electronic control system contributing to regulation type approval relevant characteristics of a vehicle, in addition to component security concepts.

Figure 7:
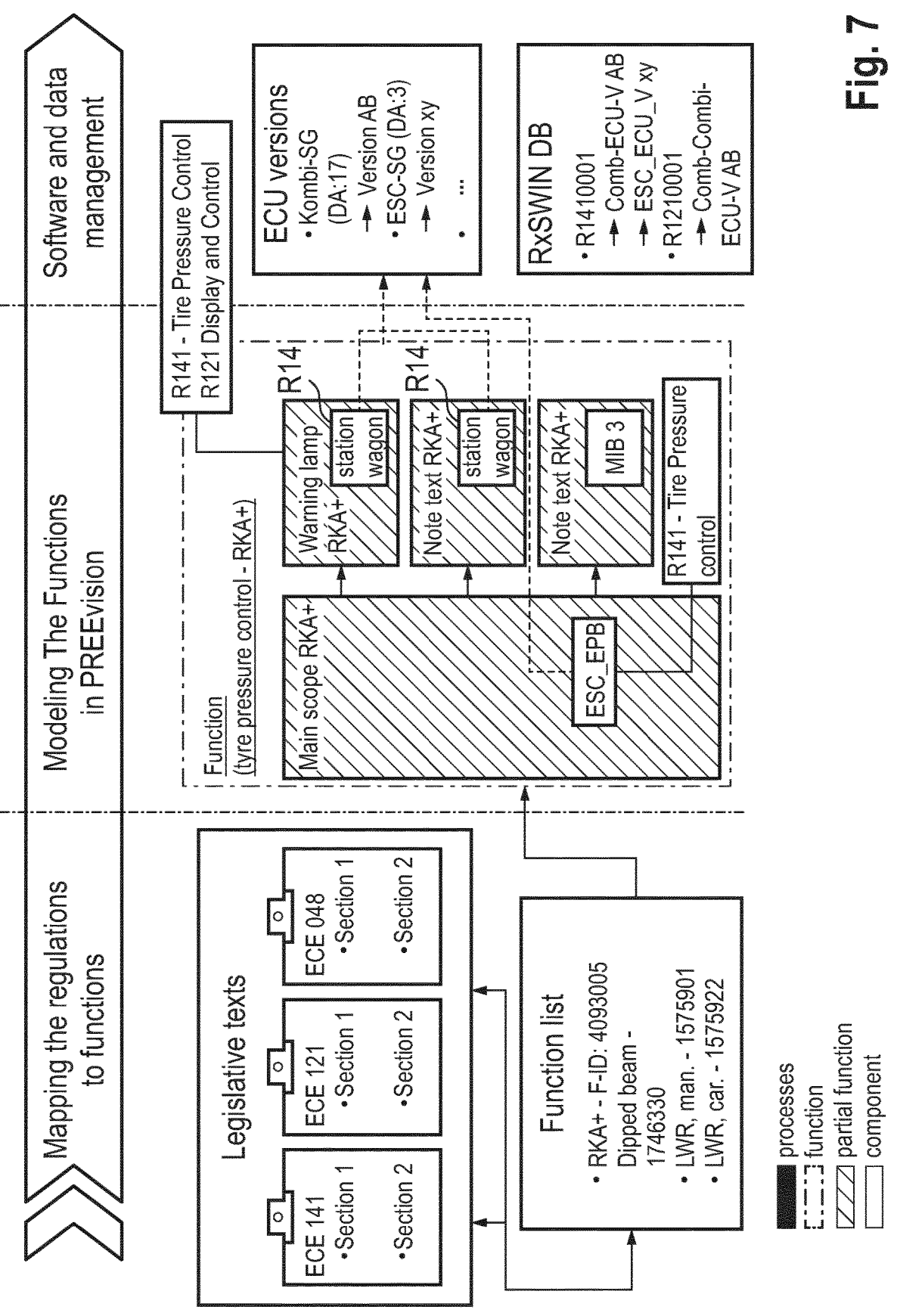

FIG. 7 shows modeling and regulatory assignment with the tool "PREEvision". A functional breakdown generates demonstrable dependencies on software, hardware, and UN ECE SUMS compliant software updates as target data container. An example for tire pressure is shown with "RKA+", wherein Regulation 141 refers to tire pressure control and regulation 121 to display and control elements.

FIG. 8 shows the application of a dedicated identifier called RxSWIN, wherein the initial letter 'R' stands for Regulation, 'x' is a placeholder and denotes the number of the applicable regulation Number x, and 'SWIN' refers to the "software identification number". This RxSWIN is a composite number connecting software, hardware, and a target data container. The target data container is a software container in which the software update is included. In case an assessment whether a planned software update affects any certification criteria is answered positive, i.e. the software update has an impact on certification criteria, an approval authority has to issue an extension of an old certificate or issue a new certificate, and for the purpose of identification and documentation the RxSWIN is incremented by one. The manufacturer of the vehicle verifies that the update can be performed safely and securely and provides the update for the vehicle user to execute it manually or automatically, depending on the configuration of the vehicle. The RxSWIN (Regulation X Software Identification Number) names the combination of software, hardware and target data container to the purpose of traceable executed software updates in vehicles and for gathering information from documentation stored in a RxSWIN database, for example located at a manufacturer site, cf. FIG. 9 for more details.

Figure 9:
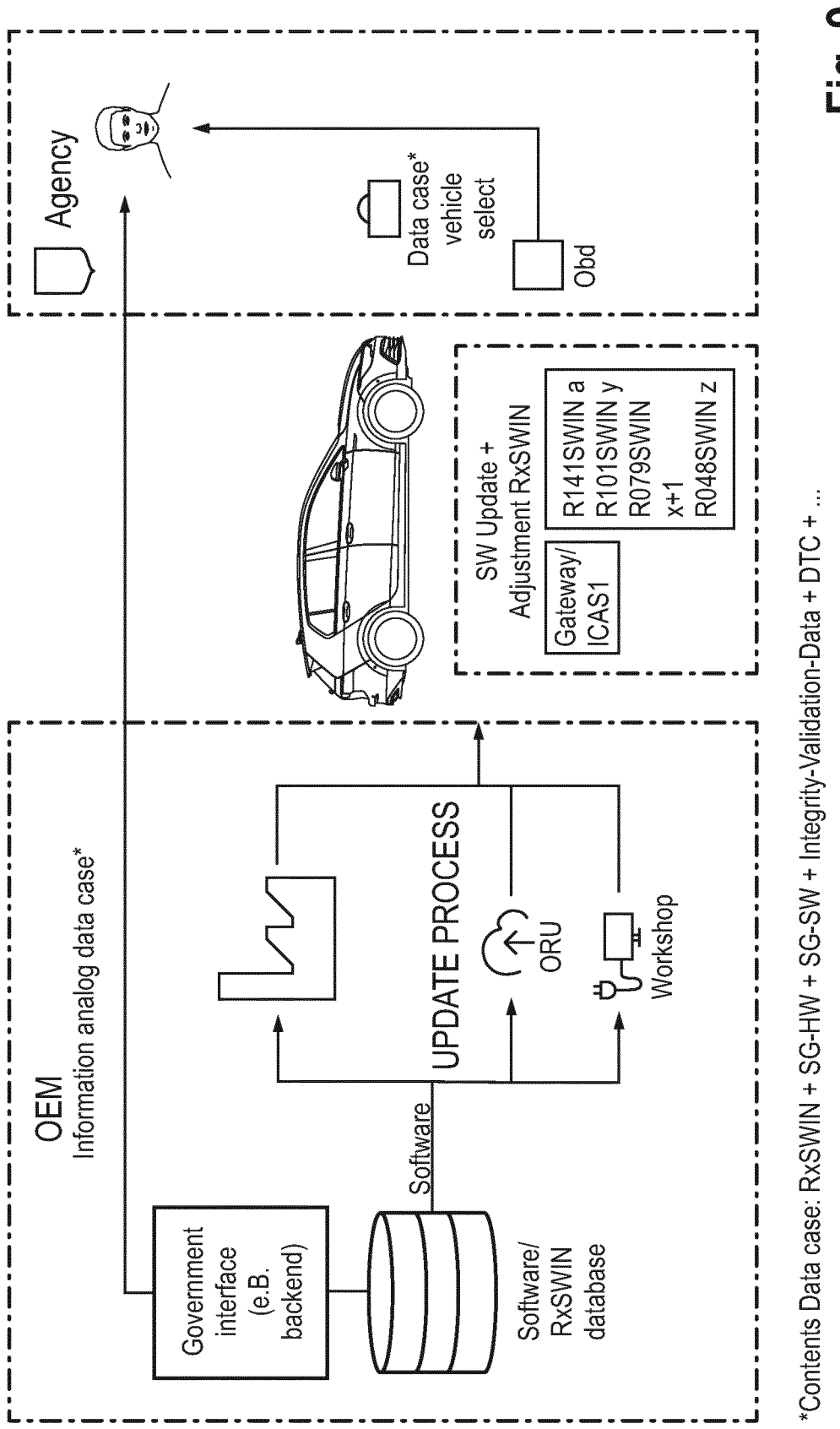

FIG. 9 shows, how a government interface of the RxSWIN database explained with FIG. 8 can be implemented to provide access to an authority, in particular an approval authority. The RxSWIN is thus the informational interface from the manufacturer's internal software control to government-readable data in form of identification numbers of the software used in a vehicle. The abbreviation 'ORU' refers to an "online remote update" and the abbreviation 'Obd' to "onboard diagnosis".

Figure 10:
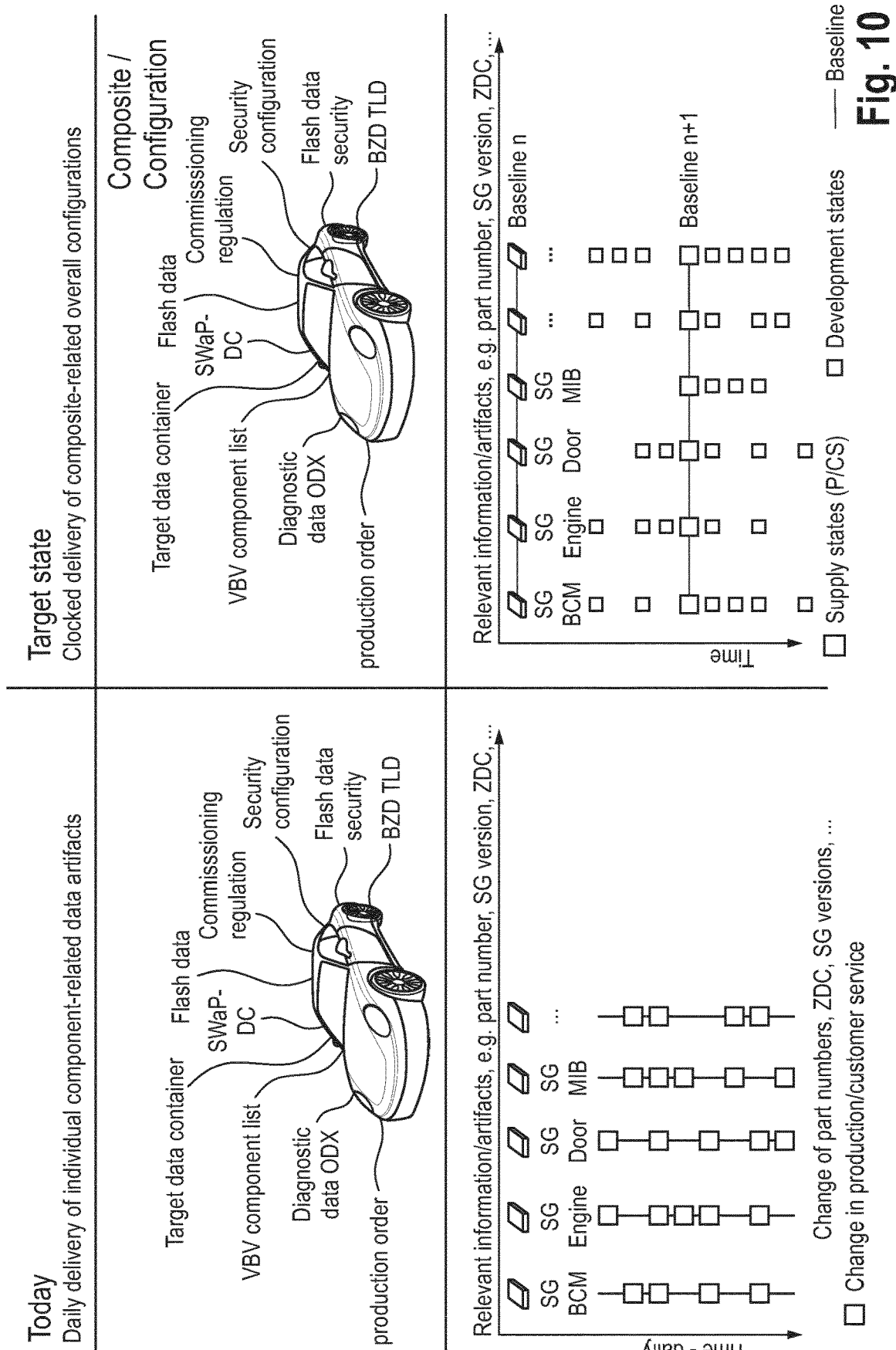
FIGS. 10 to 11 show an example software update management system in configuration management and software federation maintenance, and how a software update management system can be embedded in software composite care and in baselines.

FIG. 10 shows a software update management system in configuration management and software federation maintenance. The configuration management in the product process is adjusted to comply with applicable regulations. By introducing the above-mentioned UN ECE regulations and with increasing product complexity, powerful federation and configuration management beyond the SOP to keep the variance of federations in the field controllable is required. The 'SOP' denotes the "start of operation", while the horizontal line in the diagram in the lower right corner of FIG. 10 symbolizes the baseline, wherein the baseline describes the configuration of a vehicle at a certain point of time.

Figure 11:
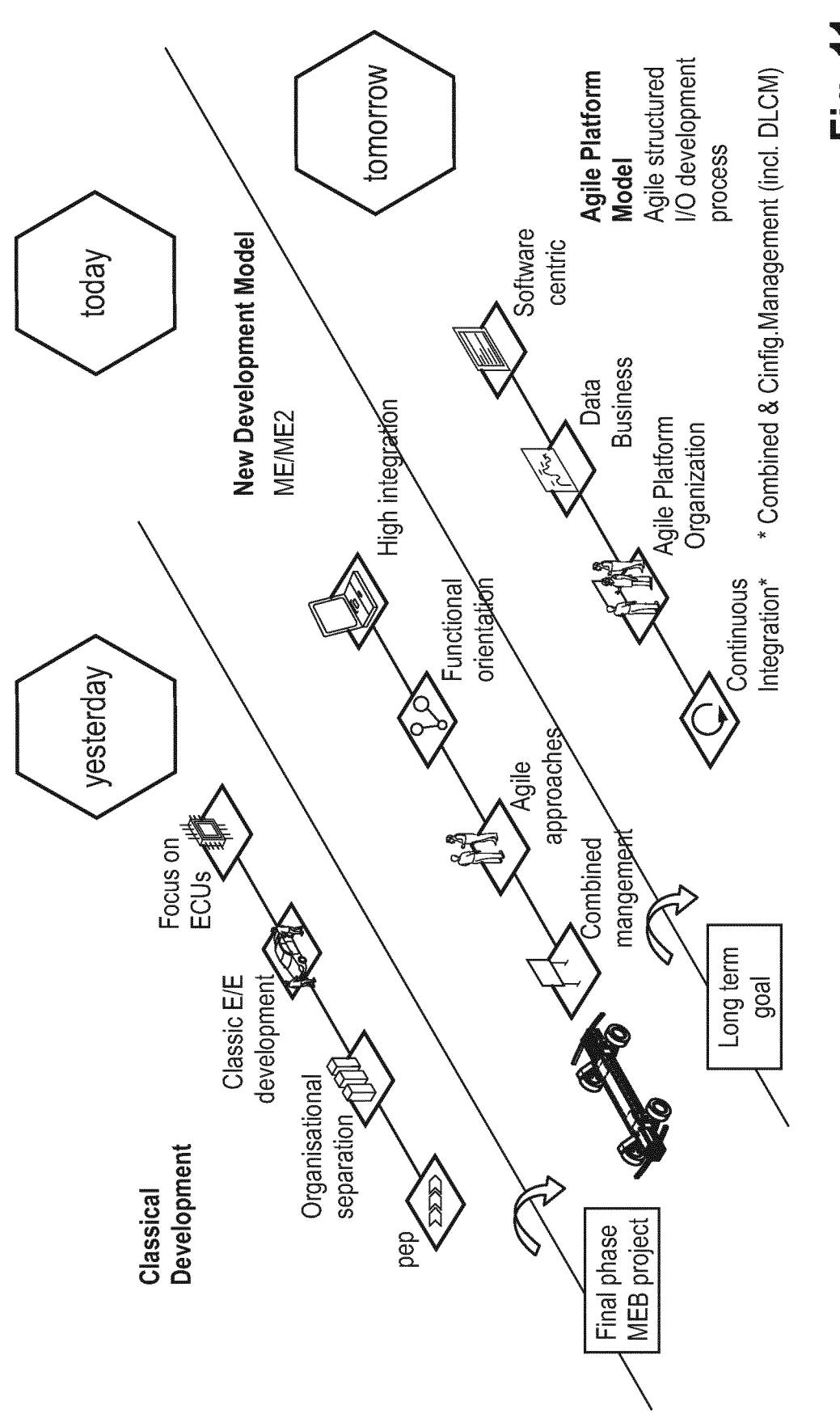

FIG. 11 shows the objective of a design of an enhanced E/E ("electrical/electronic") development process. In the lower right diagonal lane, marked by the term "tomorrow", the I/O ("input/output") development with software focused development process is shown.

FIG. 12 gives an overview of practical steps to implement a software update management system based on the development path. The 'rxSWIN' process in window number 4 of FIG. 12 marks the above mentioned method step of determining, whether the additional or changed functionality affects any certification criteria of the vehicle, and in case the additional or changed functionality affects certification criteria, updating the dedicated identifier, for example by incrementing the software identification number ('SWIN') in the RxSWIN.

FIG. 13 shows symbolically the capturing of laws and assigning them to functions, while "Special Features" are identified, which are features that connect functionality and regulations or laws, i.e. the features can typically be directly associated with parts of a regulation or other legal prescription.

Figures 14, 14A:
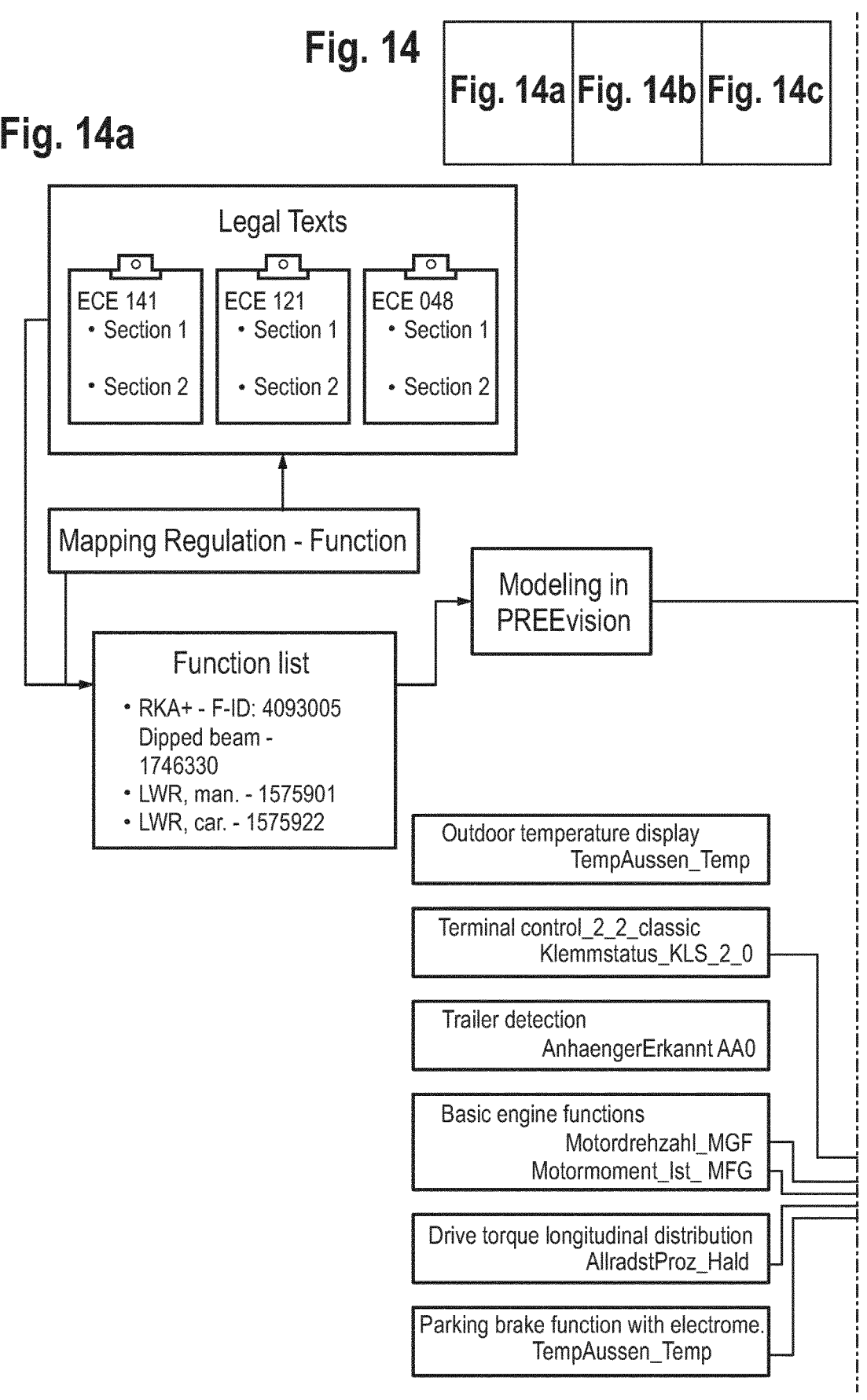
Figure 14B:
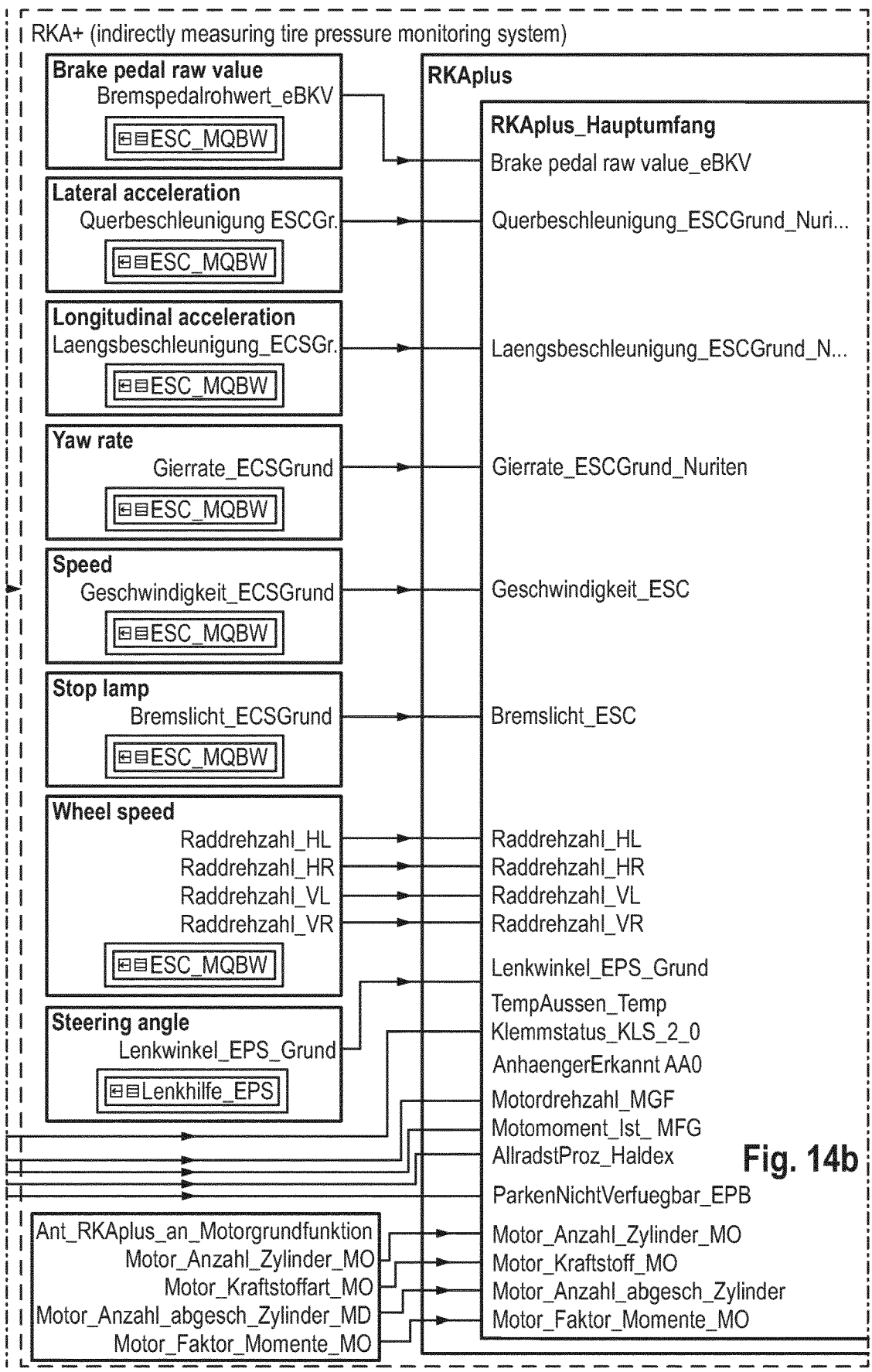
Figure 14C:
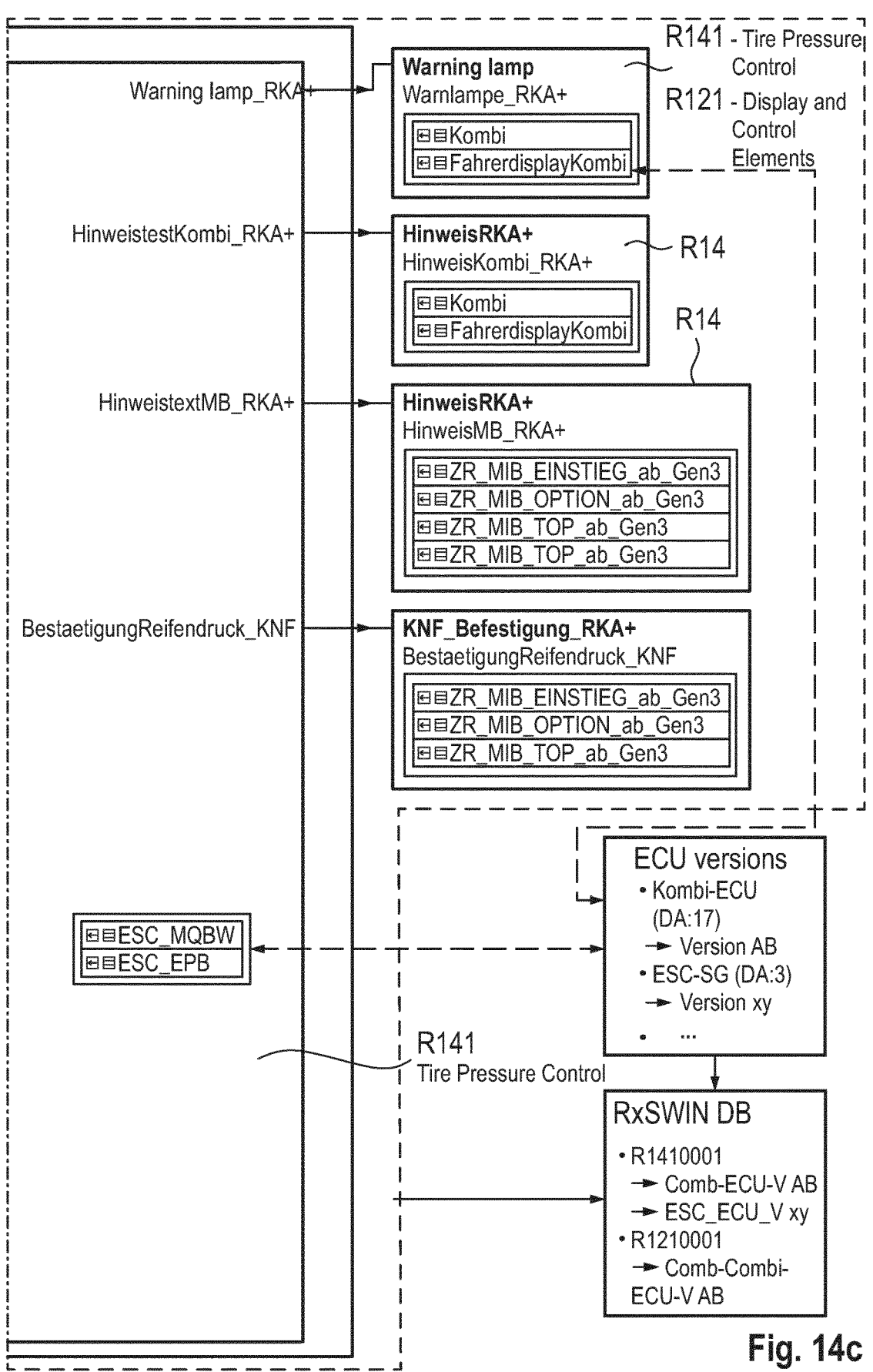

FIG. 14 refers to step (window) 2 of FIG. 12, the functional development. Hereby, regulation functions are mapped, for example automatically, to a modeling tool—in this case 'PREEvision'. This process may be done by analyzing the legal text, e.g. from an UN regulation, by scripts utilizing regular expressions for a deterministic analysis of the legal text, which may, after the preprocessing search based on regular expression is finished, be associated with certain functions from a function list by applying an artificial neural network. Eventually, the RxSWIN database is updated as explained with previous FIGS., if the software update affects any certification criteria stated in the legal text. The modeling and regulatory assignment may also be supported by the tool RKA+.

Figure 15:

FIG. 15 refers to step (window) 3 of FIG. 12, the component development and software development at component level. The abbreviation 'ZDC' refers to a "target data container" as software container for the software update.

Figure 16:
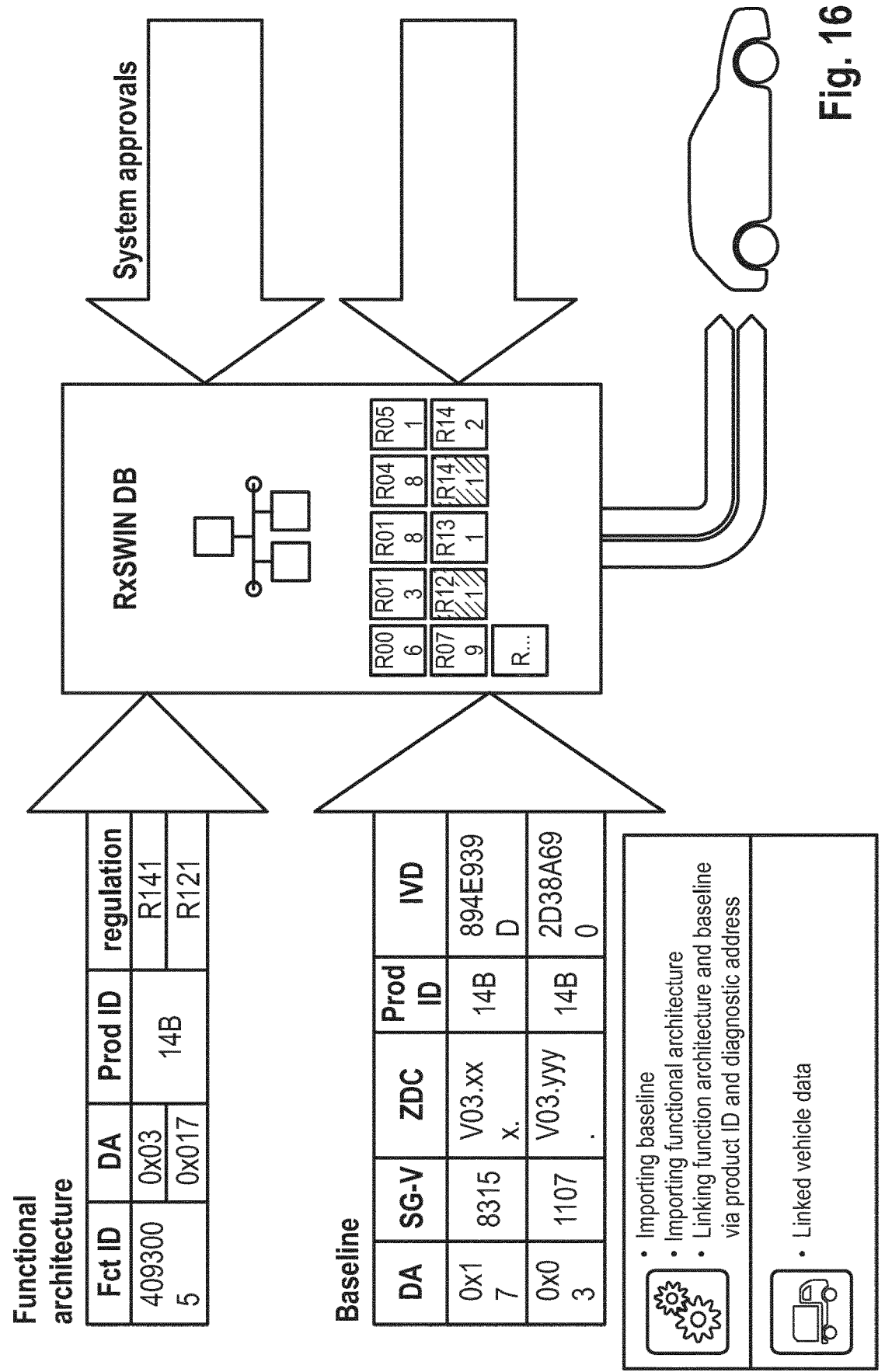

FIG. 16 refers to step (window) 4 of FIG. 12. In a first step a) vehicle-specific data are imported and consolidated. The baseline is imported, wherein the baseline describes the configuration of a vehicle at a certain point of time. The functional architecture is also imported and the function architecture and baseline are linked via the product. An RxSWIN database ("RxSWIN DB" in FIG. 16) is existing at this point.

Figure 17:
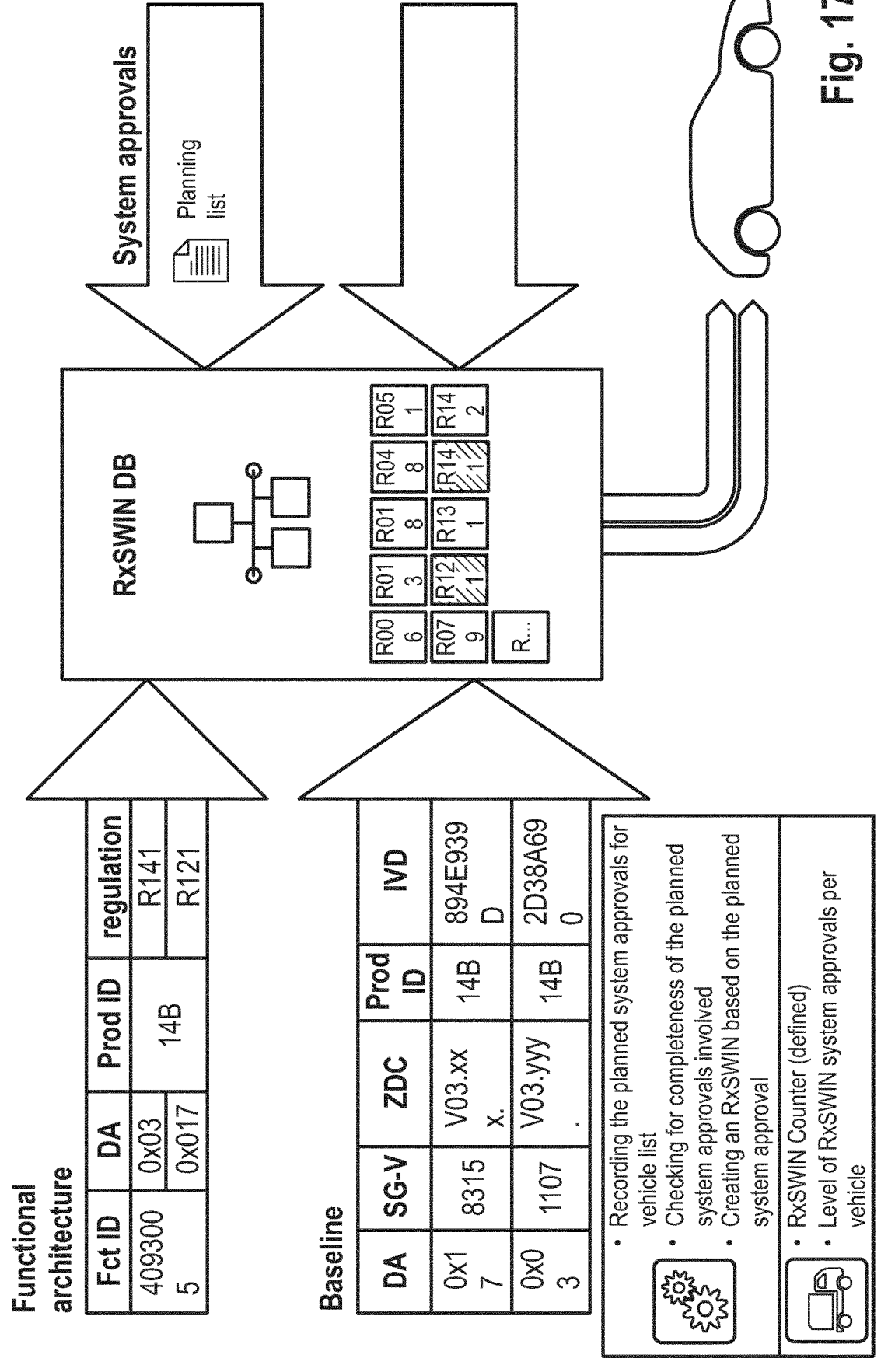

FIG. 17 refers to step (window) 4 of FIG. 12. In an intermediate step b) data are consolidated, imported, and processed. Furthermore, assignments of respective RxSWIN counter of RxSWINs in the RxSWIN database are undertaken.

Figure 18:
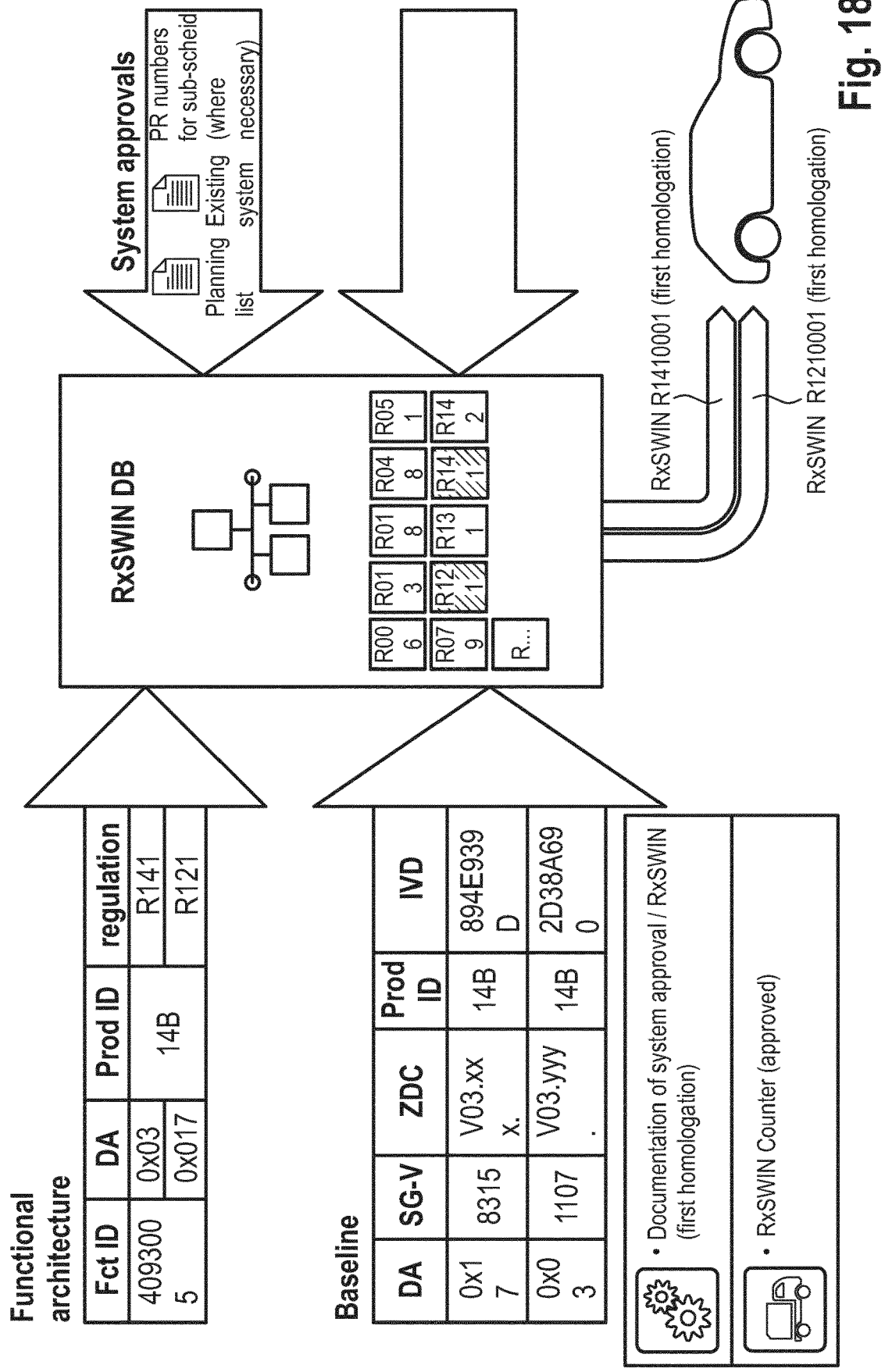

FIG. 18 refers to step (window) 4 of FIG. 12. In an intermediate step c) the confirmation of RxSWINs per regulation is done.

Figure 19:
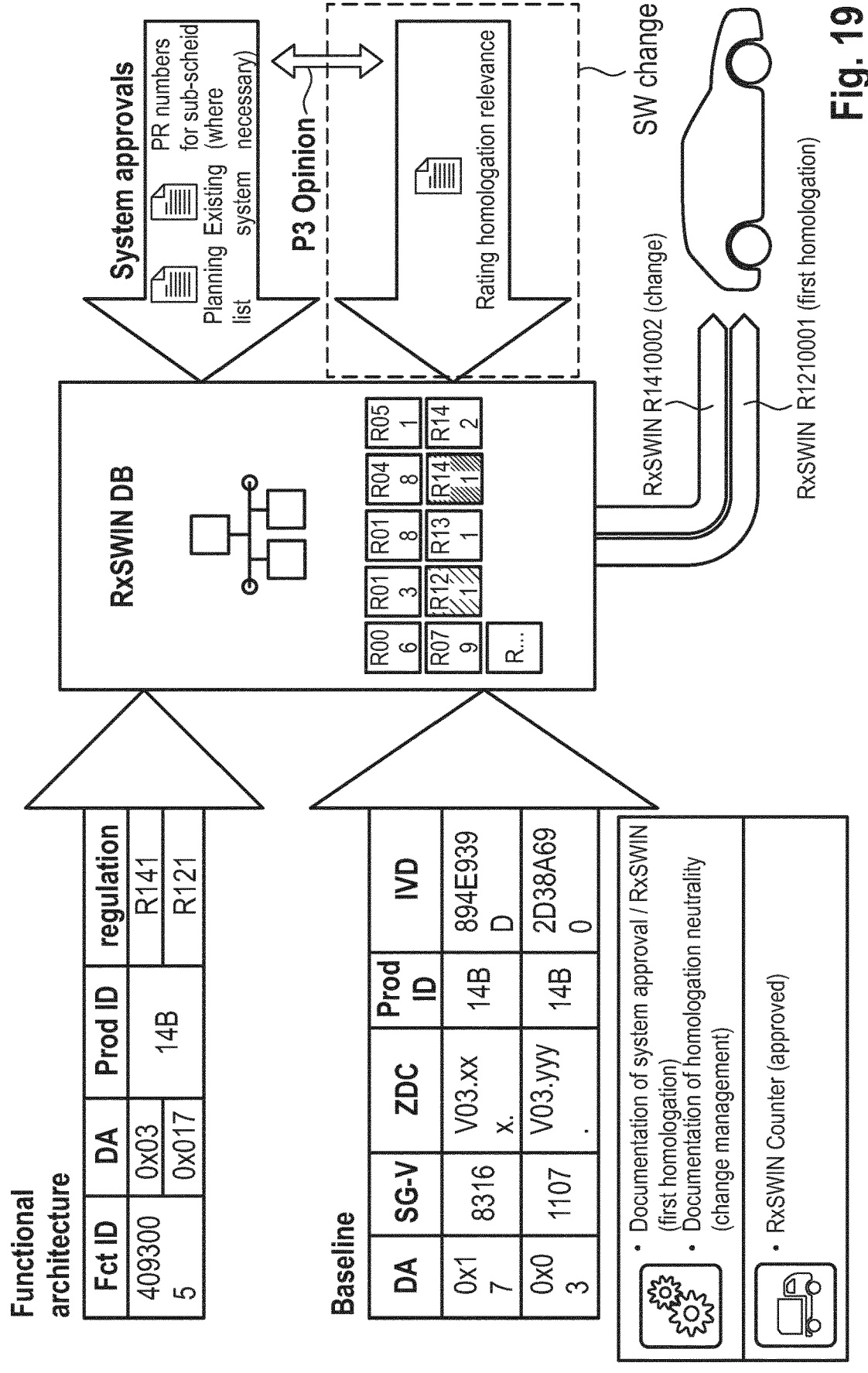

FIG. 19 refers to step (window) 4 of FIG. 12. In an intermediate step d) a software change after homologation is conducted. The block "P3 Opinion" refers to a unit for determining whether the additional or changed functionality affects any certification criteria of the vehicle.

Figure 20:
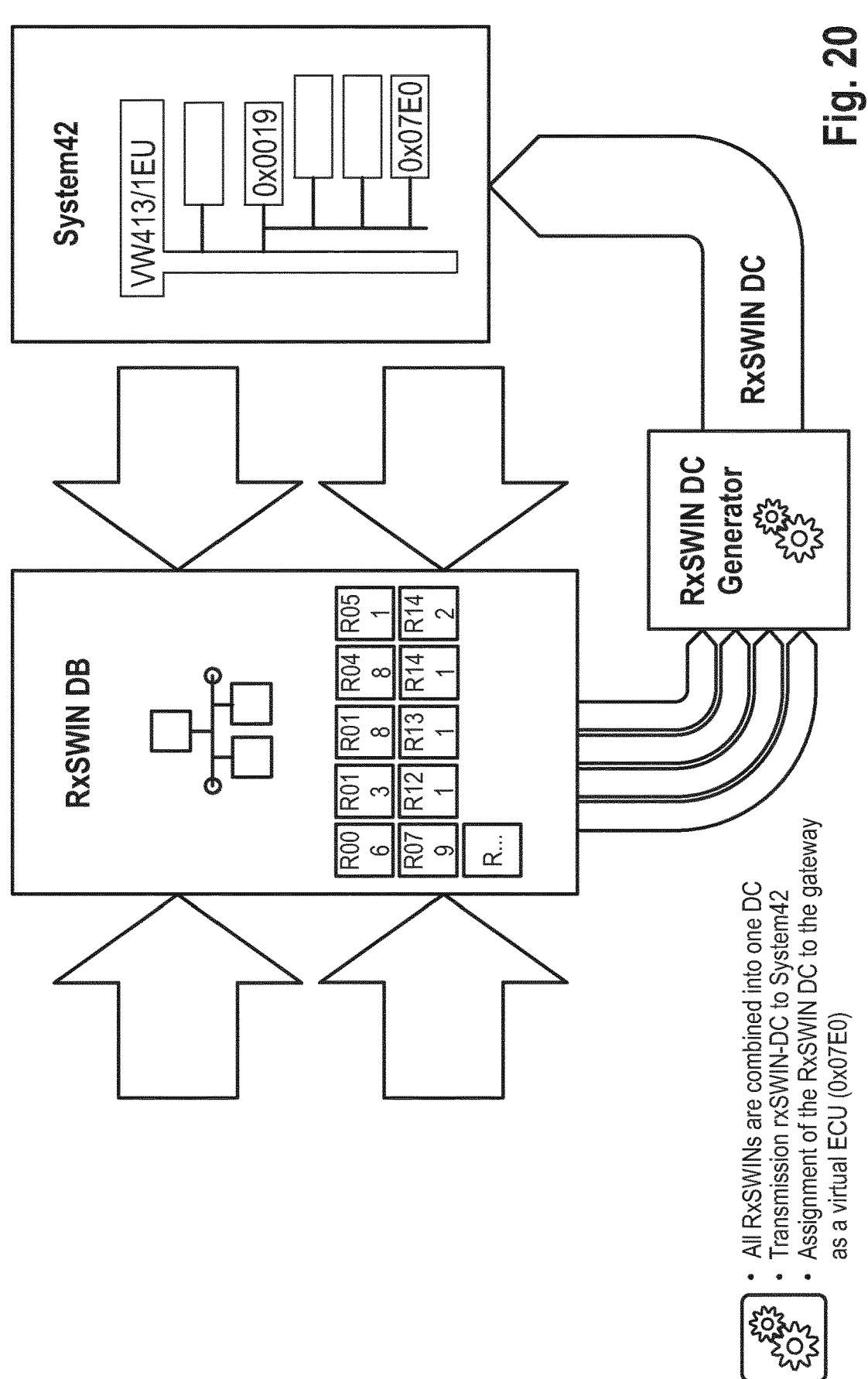

FIG. 20 refers to step (window) 4 of FIG. 12. In a final step e) the transmission of RxSWINs from the RxSWIN database ("RxSWIN DB") is conducted via a data container. While the replacement of entire software components including parameters and in particular binary is possible, a reduced software container replacing only parameters of existing software may be possible on some occasions. In FIG. 20, the DC Generator is a technical unit configured to produce a data container, in FIG. 20 denoted as "RxSWIN-DC", contain the RxSWIN applicable to the respective vehicle in question. With the help of this RxSWIN data container, a qualified technician at a car service station for instance can read the history of software updates and their associated functionality. The individual RxSWIN data container covers the software update status of an associated individual vehicle and has no meaning for other vehicles.

The RxSWINs from the individual RxSWIN data container present a form of a changelog documenting the update history of the individual vehicle.

Figure 21:
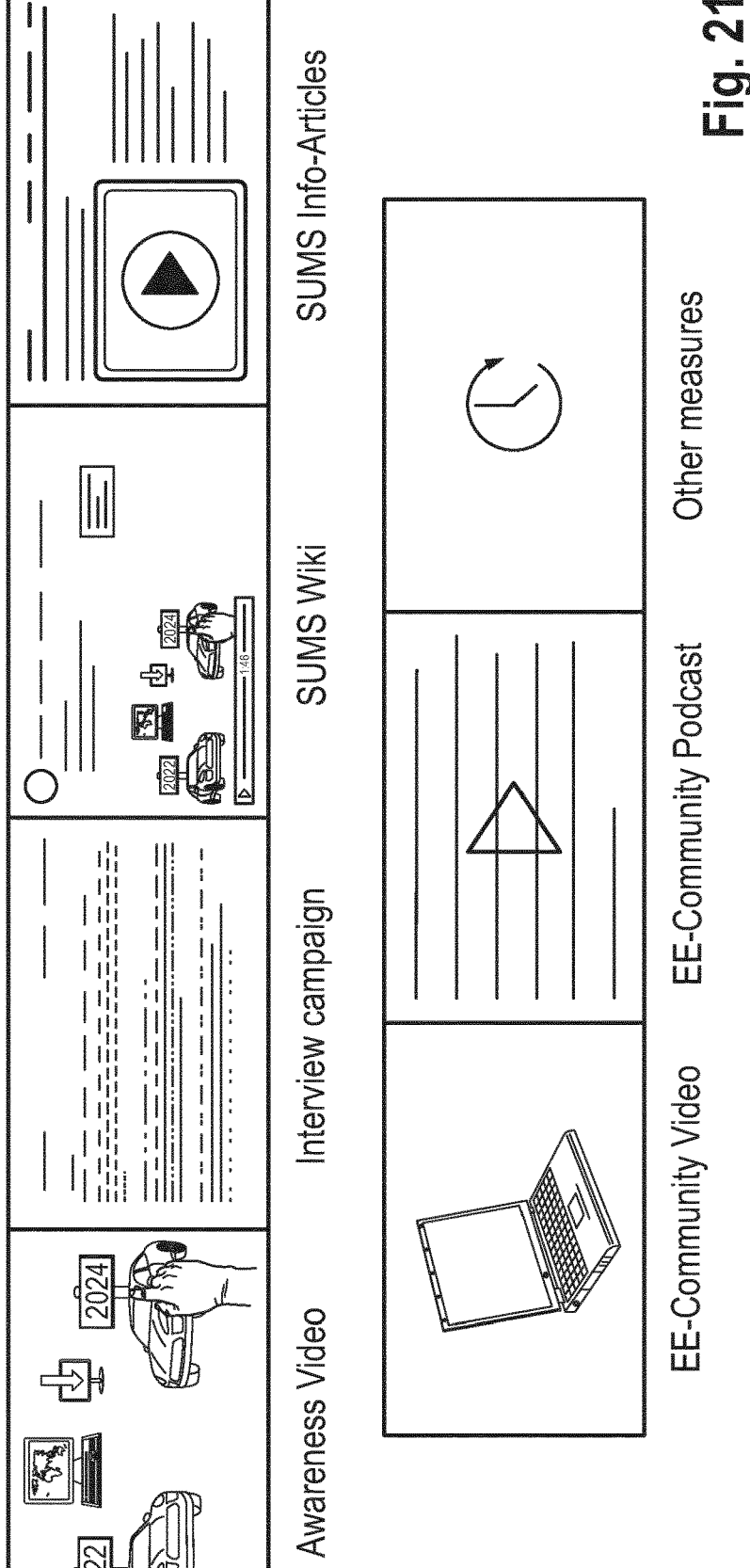
FIG. 21 shows an operational example implementation of a software update management system for the applicable organization and the required qualification of personnel.

FIG. 21 refers to an operational implementation of the software update management system and gives an overview of measures for awareness of the software update management system.

Figure 22:
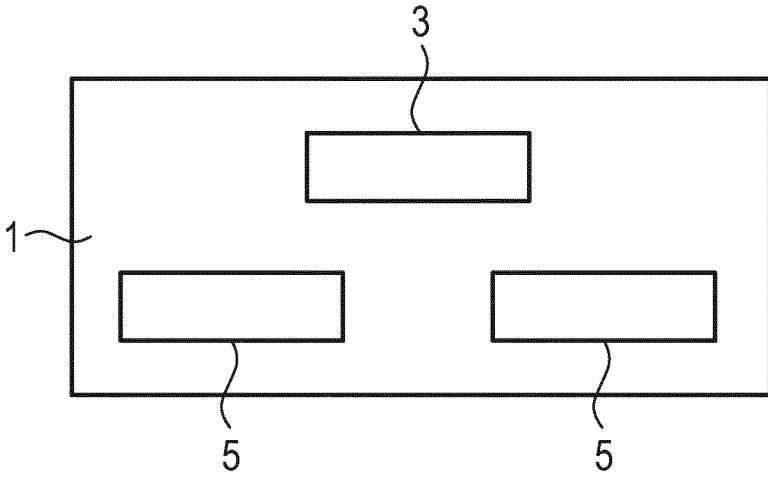
FIGS. 22 to 24 show a system for managing software updates for vehicles.

FIG. 22 shows a system 1 for managing software updates for vehicles, comprising:

a server computing device 3 configured to provide at least one software update from a software repository, and a plurality of vehicles 5, each of the vehicles having a vehicle computing device 7 configured to receive and execute the at least one software update.

Figure 23:
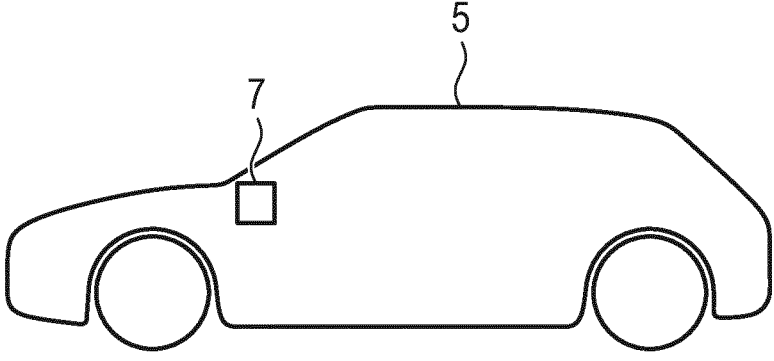

FIG. 23 shows a wheeled vehicle 5, comprising a vehicle computing device 7, wherein the vehicle computing device 7 is configured to download and execute at least one software update.

Figure 24:
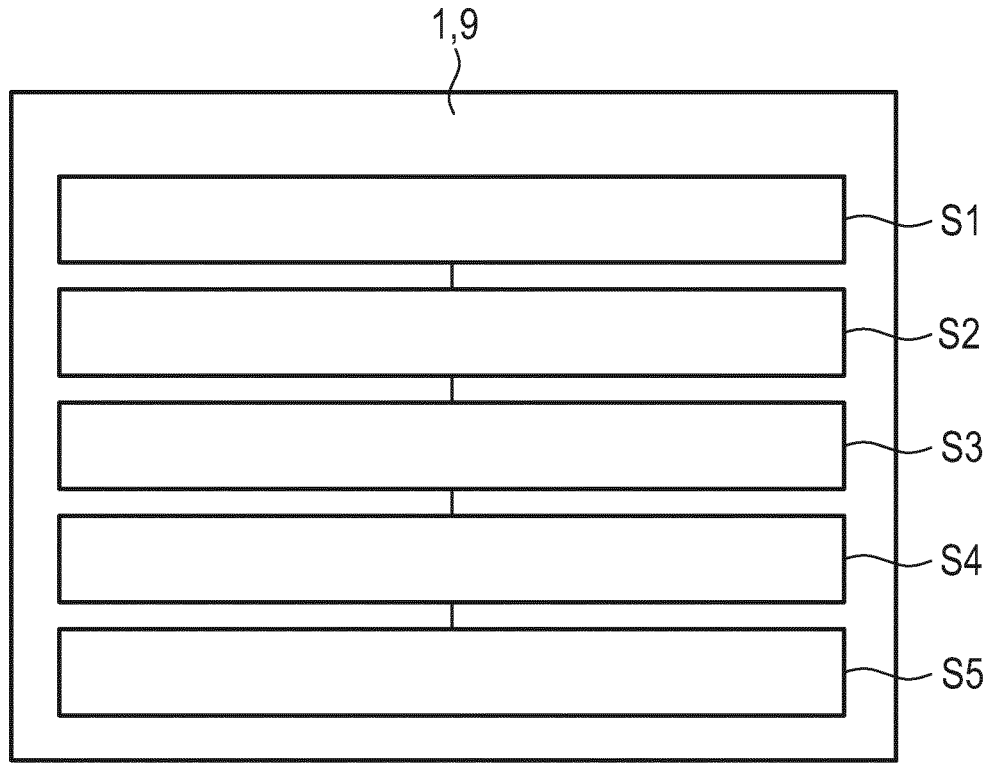

FIG. 24 shows a method carried out by a system 1 for managing software updates for vehicles, wherein the system 1 comprises a database management system 9, the method comprising:

defining S1 a software update that includes additional or changed functionality compared to a previous software package, providing S2 at least one software update from a software repository, wherein the software update comprises a dedicated identifier representing information about a type approval relevant software of an electronic control system of the vehicle contributing to regulation type approval relevant characteristics of a vehicle, determining S3 whether the additional or changed functionality affects any certification criteria of the vehicle, and in case the additional or changed functionality affects certification criteria, doing at least one of: awaiting an extension or a new certificate of an approval authority before providing the at least one software update, updating the dedicated identifier, performing a functional breakdown of at least the additional or changed functionality of the software update or the whole software update, providing S4 integrity validation data associated with the software update, and transmitting S5 the software update in form of a software container to at least one vehicle.

LIST OF REFERENCE NUMERALS

1 System
3 Server computing device
5 Vehicle
7 Vehicle computing device
Database management
9 System
S1 Defining
S2 Providing
S3 Determining
S4 Providing
S5 Transmitting The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A database management system implemented on one or more computing devices, the database management system comprising a non-transitory storage medium and a first database on the storage medium for storing a software update repository and for providing at least one software update, and comprising a second database on the storage medium for storing at least one dedicated identifier representing type approval information about software of an electronic control system relevant to a type approval of a vehicle; wherein a database management computing device of the database management system is configured to determine whether an additional or changed functionality of a defined software update affects certification criteria of the vehicle; and in case the additional or changed functionality affects certification criteria, to conduct at least one of: await an extension or a new certificate of an approval authority before providing the software update, update the dedicated identifier, and perform a functional breakdown of at least the additional or changed functionality of the software update or the whole software update.

2. The database management system of claim 1, wherein the software update repository of the first database comprises a versioned list of software updates, wherein the different versions of software updates with the same functionality are associated with different possible configurations of a vehicle type or with different vehicle types.

3. A method for managing software updates for vehicles, the method comprising:

defining a software update that includes additional or changed functionality compared to a previous software package, providing at least one software update from a software repository; wherein the software update comprises a dedicated identifier representing type approval information about a software of an electronic control system relevant to a type approval of the vehicle, the method further comprising:

determining whether the additional or changed functionality affects certification criteria of the vehicle, and in case the additional or changed functionality affects certification criteria, conducting at least one of: awaiting an extension of a new certificate of an approval authority before providing the at least one software update, updating the dedicated identifier, and performing a functional breakdown of at least the additional or changed functionality of the software update or the whole software update.

4. The method of claim 3, further comprising:

providing integrity validation data associated with the software update.

5. The method of claim 3, further comprising:

transmitting the software update in form of a software container to at least one vehicle.

6. A data processing device comprising a processor and a memory configured to perform the method of claim 3.

7. A non-transitory computer-readable storage medium comprising instructions which, when executed by a computing device, cause the computing device to carry out the method of claim 3.

8. A system for managing software updates for vehicles, the system comprising:

a data processing device according to claim 6, and a plurality of vehicles, each of the vehicles having a vehicle computing device configured to receive and execute information from the data processing device.

\*    \*    \*    \*    \*